US011770339B2

(12) United States Patent
Starsinic et al.

(10) Patent No.: US 11,770,339 B2
(45) Date of Patent: Sep. 26, 2023

(54) DYNAMIC POLICY CONTROL

(71) Applicant: InterDigital Patent Holdings, Inc., Wilmington, DE (US)

(72) Inventors: Michael F. Starsinic, Newtown, PA (US); John L. Tomici, Southold, NY (US); Qing Li, Princeton Junction, NJ (US); Ahmed Mohamed, King of Prussia, PA (US); Chonggang Wang, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/514,194

(22) PCT Filed: Sep. 30, 2015

(86) PCT No.: PCT/US2015/053175
§ 371 (c)(1),
(2) Date: Mar. 24, 2017

(87) PCT Pub. No.: WO2016/054179
PCT Pub. Date: Apr. 7, 2016

(65) Prior Publication Data
US 2017/0295103 A1    Oct. 12, 2017

Related U.S. Application Data

(60) Provisional application No. 62/057,529, filed on Sep. 30, 2014.

(51) Int. Cl.
*G06F 15/173*    (2006.01)
*H04L 47/20*    (2022.01)
(Continued)

(52) U.S. Cl.
CPC .......... *H04L 47/20* (2013.01); *H04L 41/0816* (2013.01); *H04L 41/0893* (2013.01);
(Continued)

(58) Field of Classification Search
CPC ......... H04L 47/20; H04L 47/24; H04L 43/10; H04L 43/0882; H04L 41/0893;
(Continued)

(56) References Cited

U.S. PATENT DOCUMENTS 7,907,945 B2 *   3/2011   Deprun ................. H04W 48/10
                                                                455/435.2
7,925,206 B2 *   4/2011   Jha ........................ H04L 1/0001
                                                                  455/11.1
(Continued)

FOREIGN PATENT DOCUMENTS

EP    2445266 A1    4/2012
EP    2900016 A1    7/2015
(Continued)

OTHER PUBLICATIONS

RFC 5416, Control and Provisioning of Wireless Access Points (CAPWAP) Protocol Binding for IEEE 802.11, Mar. 2009, 77 pages.
(Continued)

*Primary Examiner* — Thuong Nguyen
(74) *Attorney, Agent, or Firm* — BakerHostetler

(57) ABSTRACT

Systems, methods, and apparatus embodiments are described herein for controlling policy in integrated small cell and Wi-Fi networks (ISWNs). It is recognized herein that multiple actors within an ISWN may have needs or preferences that conflict with each other, and that the best way of reconciling those conflicting needs is not always to simply give one actor preference over another. As described herein, optimum management decisions may be dynamically
(Continued)

based on current network conditions and preferences of multiple actors.

9 Claims, 22 Drawing Sheets

(51) Int. Cl.

| | |
|---|---|
| *H04L 41/0893* | (2022.01) |
| *H04W 28/18* | (2009.01) |
| *H04L 41/0816* | (2022.01) |
| *H04W 28/02* | (2009.01) |
| *H04W 28/12* | (2009.01) |
| *H04L 43/0882* | (2022.01) |
| *H04L 43/10* | (2022.01) |
| *H04L 47/24* | (2022.01) |
| *H04W 88/06* | (2009.01) |
| *H04W 84/10* | (2009.01) |
| *H04W 72/00* | (2023.01) |
| *H04L 41/0896* | (2022.01) |
| *H04L 47/10* | (2022.01) |
| *H04L 47/125* | (2022.01) |

(52) U.S. Cl.
CPC .......... *H04L 43/0882* (2013.01); *H04L 43/10* (2013.01); *H04L 47/24* (2013.01); *H04W 28/0284* (2013.01); *H04W 28/12* (2013.01); *H04W 28/18* (2013.01); *H04L 41/0896* (2013.01); *H04L 47/10* (2013.01); *H04L 47/125* (2013.01); *H04W 72/00* (2013.01); *H04W 84/10* (2013.01); *H04W 88/06* (2013.01)

(58) Field of Classification Search
CPC ... H04L 41/0816; H04L 47/125; H04L 47/10; H04L 41/0896; H04W 28/0284; H04W 28/12; H04W 28/18; H04W 88/06; H04W 84/10; H04W 72/00
USPC ..... 709/223, 206, 213; 455/477, 426.1, 509, 455/418, 411, 446; 370/331, 230, 329, 370/235
See application file for complete search history.

(56) References Cited

U.S. PATENT DOCUMENTS

| | | | | |
|---|---|---|---|---|
| 8,515,434 B1* | 8/2013 | Narendran | ............ | H04W 48/02 455/446 |
| 10,219,310 B2* | 2/2019 | Kanugovi | ......... | H04W 28/0247 |
| 10,241,641 B1* | 3/2019 | Thantharate | ......... | H04W 36/14 |
| 2003/0081621 A1* | 5/2003 | Godfrey | .............. | H04L 67/2819 370/400 |
| 2004/0127191 A1* | 7/2004 | Matsunaga | ........... | H04W 24/10 455/423 |
| 2004/0180652 A1* | 9/2004 | Jang | .................... | H04W 52/143 455/426.2 |
| 2006/0099954 A1* | 5/2006 | Henderson | .............. | H04L 45/00 455/447 |
| 2007/0019598 A1* | 1/2007 | Prehofer | ........... | H04W 36/0055 370/338 |
| 2007/0081493 A1* | 4/2007 | Rune | ....................... | H04L 45/48 370/331 |
| 2008/0031212 A1* | 2/2008 | Ogura | ................. | H04W 28/16 370/338 |
| 2008/0049703 A1* | 2/2008 | Kneckt | ................. | H04W 68/00 370/342 |
| 2009/0124284 A1* | 5/2009 | Scherzer | ........... | H04M 1/72445 455/552.1 |
| 2010/0011254 A1* | 1/2010 | Votta | ..................... | G06F 11/004 714/47.2 |
| 2010/0150107 A1* | 6/2010 | Aghvami | .......... | H04W 36/0016 370/331 |
| 2010/0151894 A1* | 6/2010 | Oh | ....................... | H04W 72/082 455/509 |
| 2010/0297997 A1* | 11/2010 | Yavuz | ................... | H04W 36/20 455/436 |
| 2011/0250875 A1* | 10/2011 | Huang | .................... | H04W 4/38 455/418 |
| 2011/0306386 A1* | 12/2011 | Centoza | ............ | H04W 28/0289 455/552.1 |
| 2012/0039265 A1* | 2/2012 | Patel | .................... | H04W 52/143 370/329 |
| 2012/0069750 A1* | 3/2012 | Xing | ..................... | H04W 76/25 370/252 |
| 2012/0094646 A1* | 4/2012 | Hidaka | ............... | H04W 72/082 455/418 |
| 2012/0131098 A1* | 5/2012 | Wood | .................. | H04N 21/4722 709/203 |
| 2013/0095789 A1* | 4/2013 | Keevill | ................ | H04W 12/068 455/411 |
| 2013/0143542 A1* | 6/2013 | Kovvali | ................ | H04W 88/18 455/418 |
| 2013/0155851 A1* | 6/2013 | Koodli | .................. | H04L 45/308 370/230 |
| 2013/0159479 A1* | 6/2013 | Vasseur | ................... | H04L 47/10 709/221 |
| 2013/0232216 A1* | 9/2013 | Tiger | ................ | H04W 52/0209 709/213 |
| 2013/0322261 A1* | 12/2013 | Yeh | ........................ | H04W 48/18 370/241 |
| 2013/0331118 A1* | 12/2013 | Chhabra | ........... | H04W 52/0229 455/456.1 |
| 2014/0033288 A1* | 1/2014 | Wynn | .................... | H04W 48/18 726/7 |
| 2014/0044114 A1* | 2/2014 | Lee | ........................ | H04W 76/14 370/338 |
| 2014/0068727 A1* | 3/2014 | Shamis | ................ | H04W 12/50 726/5 |
| 2014/0133375 A1* | 5/2014 | McDiarmid | ........ | H04W 52/267 370/311 |
| 2014/0134991 A1* | 5/2014 | Walker | .................. | H04W 24/02 455/418 |
| 2014/0199996 A1* | 7/2014 | Wang | ..................... | H04W 36/14 455/426.1 |
| 2014/0281499 A1* | 9/2014 | Schentrup | ........... | G06F 12/1408 713/156 |
| 2014/0293948 A1* | 10/2014 | Jiang | ..................... | H04L 5/0032 370/329 |
| 2014/0328190 A1* | 11/2014 | Lord | ..................... | H04W 24/08 370/252 |
| 2015/0045021 A1* | 2/2015 | Schlatter | ............... | H04W 36/32 455/434 |
| 2015/0045023 A1* | 2/2015 | Rattner | ............... | H04W 48/16 455/434 |
| 2015/0049649 A1* | 2/2015 | Zhu | .................... | H04W 52/367 370/277 |
| 2015/0078346 A1* | 3/2015 | Farhadi | ................ | H04W 16/14 370/336 |
| 2015/0078359 A1* | 3/2015 | Scahill | ................ | H04W 88/08 370/338 |
| 2015/0081860 A1* | 3/2015 | Kuehnel | ................ | H04W 8/18 709/224 |
| 2015/0140924 A1* | 5/2015 | Marathe | .................. | H04W 4/90 455/3.01 |
| 2015/0163811 A1* | 6/2015 | Konstantinou | ....... | H04W 76/16 370/329 |
| 2015/0173011 A1* | 6/2015 | Das | ...................... | H04W 24/02 370/328 |
| 2015/0188786 A1* | 7/2015 | Burns | ................... | G06Q 10/10 709/224 |
| 2015/0197010 A1* | 7/2015 | Ruuspakka | ........... | B25J 9/1664 700/245 |
| 2015/0280995 A1* | 10/2015 | Centoza | .................. | H04L 67/53 455/552.1 |
| 2015/0289183 A1* | 10/2015 | Iimori | ................... | H04W 36/14 370/331 |

(56) References Cited

U.S. PATENT DOCUMENTS

| | | | |
|---|---|---|---|
| 2015/0296450 A1* | 10/2015 | Koo | H04W 48/16 455/435.3 |
| 2015/0365344 A1* | 12/2015 | Manral | H04L 47/17 370/237 |
| 2015/0379202 A1* | 12/2015 | Plasse | G16H 10/60 705/51 |
| 2016/0014127 A1* | 1/2016 | Mohebbi | H04W 12/03 455/411 |
| 2016/0050551 A1* | 2/2016 | Qi | H04W 76/14 455/434 |
| 2016/0088115 A1* | 3/2016 | Agnew | H04L 51/26 709/206 |
| 2016/0198364 A1* | 7/2016 | Schwarzbauer | H04W 28/08 370/331 |
| 2016/0295482 A1* | 10/2016 | Belghoul | H04W 36/32 |
| 2016/0337846 A1* | 11/2016 | Lekontsev | H04W 8/22 |
| 2016/0337917 A1* | 11/2016 | Kawai | H04W 4/02 |
| 2016/0373982 A1* | 12/2016 | Nagasaka | H04W 48/18 |
| 2017/0094054 A1* | 3/2017 | Li | H04M 3/42153 |
| 2017/0142730 A1* | 5/2017 | Han | H04W 72/0453 |
| 2017/0245190 A1* | 8/2017 | Katar | H04W 36/36 |
| 2017/0245211 A1* | 8/2017 | Patil | H04W 52/0206 |
| 2017/0295103 A1* | 10/2017 | Starsinic | H04L 41/0816 |
| 2017/0311169 A1* | 10/2017 | Cai | H04W 72/00 |
| 2018/0098256 A1* | 4/2018 | Halepovic | H04W 4/029 |
| 2018/0152393 A1* | 5/2018 | Hoffman | H04L 47/6255 |
| 2018/0332178 A1* | 11/2018 | Ni | H04N 21/4438 |

FOREIGN PATENT DOCUMENTS

| | | |
|---|---|---|
| WO | 2012/061967 A1 | 5/2012 |
| WO | 2012/126848 A1 | 9/2012 |
| WO | 2013/085486 A1 | 6/2013 |
| WO | 2014/015343 A1 | 1/2014 |
| WO | 2014/105115 A1 | 7/2014 |
| WO | 2014/204404 A1 | 12/2014 |

OTHER PUBLICATIONS

RFC 5415, Control and Provisioning of Wireless Access Points (CAPWAP) Protocol Specification, Mar. 2009, 156 pages.

RFC 3418, Management Information Base (MIB) for the Simple Network Management Protocol (SNMP), Dec. 2002, 26 pages.

RFC 3411, An Architecture for Describing Simple Network Management Protocol (SNMP) Management Frameworks, Dec. 2002, 65 pages.

Cisco Licensed Small Cell Solution; Reduce Costs, Improve Coverage and Capacity, Cisco Feb. 2013, 19 pages.

Broadband Forum Technical Report, TR-196 Femto Access Point Service Data Model; Issue 2, Nov. 2011, 46 pages.

Broadband Forum Technical Report, TR-069 CPE WAN Management Protocol; Issue 1, Amendment 4, Protocol Version 1.3, Jul. 2011, 190 pages.

3rd Generation Partnership Project; 3GPP TS 32.593, V12.0.0; Technical Specification Group Services and System Aspects; Telecommunication Management; Home Enchanced Node B (HeNB) Operations, Administration, Maintenance and Provisioning (OAM&P); Procedure Flows for Type 1 Interface HeNB to HeNB Management System (HeMS) (Release 12), Jun. 2014, 20 pages.

3rd Generation Partnership Project; 3GPP TS 32.592, V12.0.0; Technical Specification Group Services and System Aspects; Telecommunications Management; Home Enhanced Node B (HeNB) Operations, Administration, Maintenance and Provisioning (OAM&P); Information Model for Type 1 Interface HeNB to HeNB Management System (HeMS) (Release 12), Dec. 2013, 92 pages.

3rd Generation Partnership Project; 3GPP TS 32.582, V11.0.0; Technical Specification Group Services and System Aspects; Telecommunication Management; Home Node B (HNB) Operations, Administration, Maintenance and Provisioning (OAM&P); Information Model for Type 1 Interface HNB to HNB Management System (HMS) (Release 11), Sep. 2012, 23 pages.

3rd Generation Partnership Project; 3GPP TS 29.215, V12.4.0.; Technical Specification Group Core Network and Terminals; Policy and Charging Control (PCC) over S9 Reference Point; Stage 3 (Release 12); Jun. 2014, 89 pages.

3rd Generation Partnership Project; 3GPP TS 23.203, V13.1.0; Technical Specification Group Services and System Aspects; Policy and Charging Control Architecture (Release 13), Sep. 2014, 223 pages.

3rd Generation Partnership Project; 3GPP TR 23.896, V1.3.1; Technical Specification Group Services and System Aspects; Technical Report on Support for Fixed Broadband Access Network Convergence; Stage-2 (Release 12), Sep. 2013, 78 pages.

3rd Generation Partnership Project: 3GPP TS 23.139, V12.1.0; Technical Specification Group Services and System Aspects; 3GPP System—Fixed Broadband Access Network Interworking; Stage 2 (Release 12), Sep. 2014, 88 pages.

* cited by examiner

DYNAMIC POLICY CONTROL

CROSS REFERENCE TO RELATED APPLICATIONS

This application is a National Stage Application filed under 35 U.S.C. 371 of International Application No. PCT/US2015/053175, filed Sep. 30, 2015, which claims the benefit of U.S. Provisional Patent Application Ser. No. 62/057,529 filed Sep. 30, 2014, the disclosure of which is hereby incorporated by reference as if set forth in its entirety.

BACKGROUND

An integrated small cell/Wi-Fi network (ISWN) can currently be built with commercially available products. FIG. 1 shows an example architecture of an example ISWN 101 that includes commercial products that are currently available. For example, as shown, the ISWN architecture 101 includes a wireless controller 103 that controls one or more Wi-Fi access points 105 that broadcast the same SSID as each other. In an example split media access control (MAC) deployment, the access points 105 can control all 802.11 signaling between the network and connected Wi-Fi devices, and all data frames can be tunneled to the wireless controller 103. The wireless controller can provide quality of service (QoS) treatment, via packet marking, to the data frames, and the wireless controller 103 can forward the data frames to their respective destination. In an example local-MAC deployment, the wireless controller can handle the signaling and data frames from the connected Wi-Fi devices, and thus the access points 105 can be thought of as 802.11 radios that are managed by the wireless controller 103.

Still referring to FIG. 1, the wireless controller 103 can manage the coverage area of each access point 105 by commanding each access point 105 to measure the signal strength that it observes from other access points and by adjusting the signal strength of each access point accordingly. The wireless controller 103 can often provide the site manager with a map that shows the relative position and coverage area of each access point. By way of example, the "Cisco 3G Small Cell for Aironet" is depicted as being connected to either the wireless controller 103 (and thus can be one of the access points 105) or a small cell gateway 107 (and thus can be a HNB 109) because the "Cisco 3G Small Cell for Aironet" can be configured with a Wi-Fi or Small Cell module.

The example small cell gateway 107 depicted in FIG. 1 can be equipment that resides on the operator's premises 111. The small cell gateway 107 can include a Security Gateway (SeGW) a Home Node B Gateway (HNB-GW) 121 (see FIG. 2). As shown, each HNB 109 in the integrated small cell network 101 has a separate connection to the small cell gateway 107. Further, as shown, the wireless local area network controller (WLC) 103 depicted in FIG. 1 has a connection to the operator's premises 111 for mobile network operator (MNO) traffic that is offloaded to Wi-Fi.

The architecture depicted in FIG. 1 is representative of an example ISWN 101 that is built using commercially available Wi-Fi and cellular products. Several actors within various ISW networks, such as the ISWN 101 depicted in FIG. 1, may have an interest in how the Small Cells and Wi-Fi access points (Aps) are managed. For example, an Enterprise IT Department, an MNO, an application provider, or end users may desire at least some control over how network resources are managed. Further, the preferences, or requirements, of one actor may be different than the preferences, or requirements, of another actor. Existing approaches, such as the architecture shown in FIG. 1, do not allow for dynamic management. For example, the TR-069 Server might not have knowledge of, and thus cannot efficiently react to, various conditions of the ISWN, such as a network congestion condition for example.

SUMMARY

Systems, methods, and apparatus embodiments are described herein for controlling policy in integrated small cell and Wi-Fi networks (ISWNs). It is recognized herein that multiple actors within an ISWN may have needs or preferences that conflict with each other, and that the best way of reconciling those conflicting needs is not always to simply give one actor preference over another. As described herein, optimum management decisions may be dynamically based on current network conditions and preferences of multiple actors.

In an example embodiment, a system or network includes a network node or entity that communicates with a first access point to a first network and a second access point to a second network. An event is detected at the network entity. The event may be associated with one of the first and second networks. Based on the detected event, the network entity may determine one or more parameters for the other of the first and second networks. The network entity may send the one or more parameters to the access point of the other of the first and second networks such that the access point of the other of the first and second networks is configured with the one or more parameters. By way of example, detecting the event may include receiving an indication that traffic associated with the one of the first and second networks has changed, receiving an indication that a measure of congestion or interference associated with one of the first and second access points has exceeded a threshold, or receiving a new policy related to the one of the first and second networks. In an example embodiment, the first network is a Wi-Fi network, and the first access point is a Wi-Fi access point. The second network may be a small cell network, and the second access point may be a small cell access point. The one or more parameters may re-route data traffic of at least one user equipment (UE) in the first and second network.

DETAILED DESCRIPTION OF ILLUSTRATIVE EMBODIMENTS

The ensuing detailed description is provided to illustrate exemplary embodiments and is not intended to limit the scope, applicability, or configuration of the invention. Various changes may be made in the function and arrangement of elements and steps without departing from the spirit and scope of the invention.

As used herein, unless otherwise specified, the terms small cell, Home Enhanced NodeB (HeNB), Home NodeB (HNB), femto cell, and femto access point (FAP) are used in ways that are generally interchangeable. For convenience, and to remain consistent with the TR-069 Standard, Customer Premise Equipment (CPE) Wireless Access Network (WAN) Management Protocol, Issue: 1 Amendment 4, July 2011 ("TR-069"), the term FAP is typically used herein when discussing TR-069.

It is recognized herein that existing mechanisms should be improved for efficiently managing a local network within an integrated small cell/Wi-Fi (ISW) network. For example, a management plane may be integrated within an ISW network. The management plane many be integrated into the ISW network in a manner similar to how control and data planes are integrated. As described herein, the integrated management plane may allow the local ISW network to autonomously adapt to changing network conditions.

Current approaches to ISW networks lack a logical function that can dynamically evaluate local current network conditions, assess various management preferences of network operations, and adjust how network resources are utilized. It is recognized herein that a logical entity in the local network can make decisions regarding management configurations such as, for example, local IP access, neighbor lists, TX power, operating frequency, and local services. Further, the logical entity may dynamically reconfigure settings related to what transport networks are used to route data to various destinations. Such decisions can be referred to generally as offloading decisions.

Figure 8:
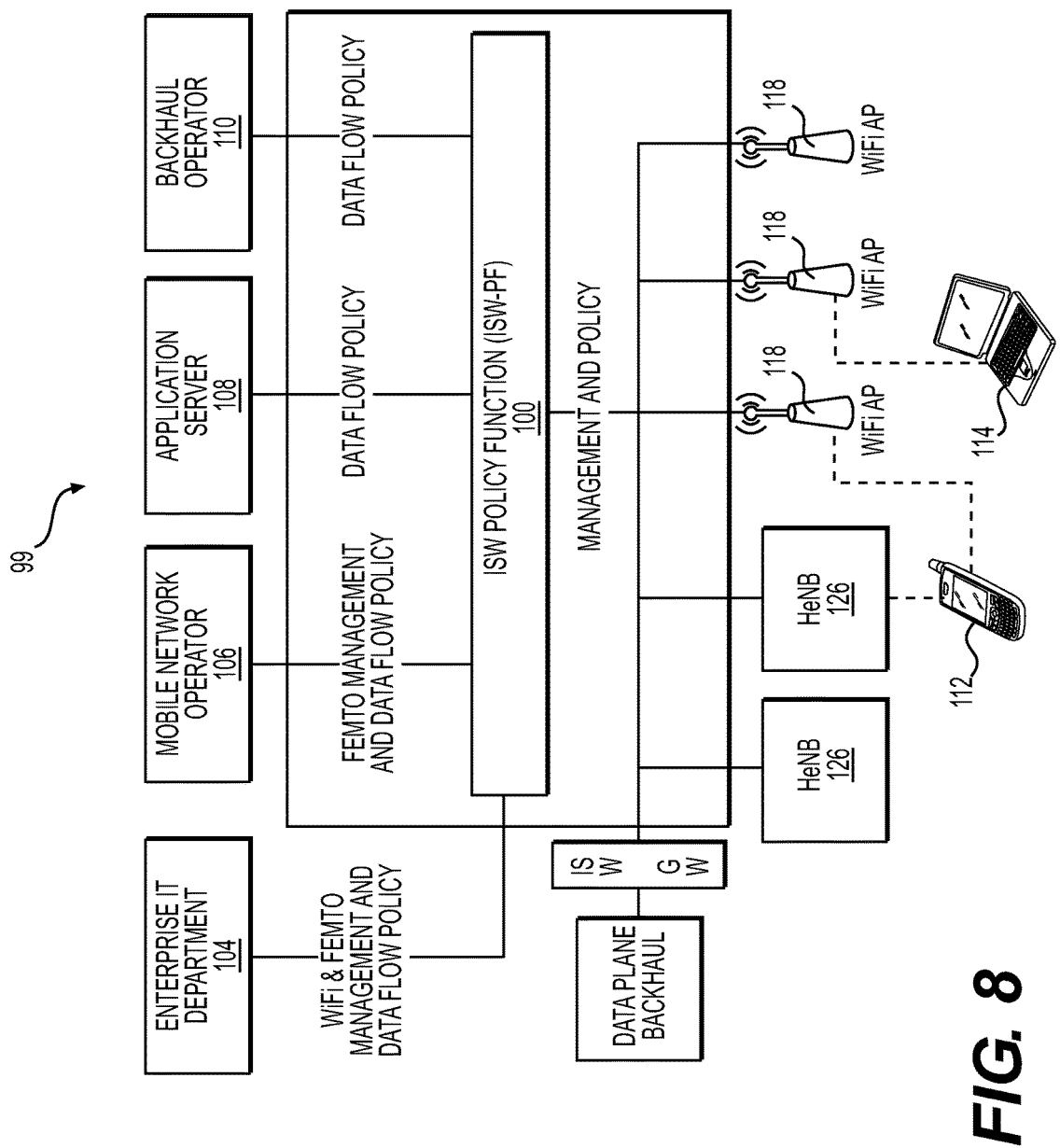
FIG. 8 is a system diagram of an integrated small cell Wi-Fi (ISW) architecture that includes an ISW policy function in accordance with an example embodiment.

Referring generally to FIG. 8, described herein is an architecture that includes a logical function, for instance an integrated small cell/Wi-Fi policy function (ISW-PF) 100 within an ISW network 99, that may collect various network management parameters. Network management parameters may be collected from a mobile network operator (MNO) 106 and a Local Network Operator. The ISW-PF 100 may observe local network conditions. Based on local network conditions, the ISW-PF 100 may dynamically adjust a configuration of the ISW network 99. For example, the ISW-PF 100 may adjust a configuration of the small cells or the Wi-Fi access points.

The network management parameters that are collected from the MNO 106 and Local Network Operator may include permissions that indicate which applications are allowed to run in the network 99. By way of further example, the parameters may be indicative of configurations of closed subscriber groups; how to prioritize conflicting policies between a site owner, a policy and charging rules function (PCRF), an auto configuration server (ACS), and an application programming interface (API); what frequencies may be used; what range of transmit power may be used; or the like. Examples of local network conditions that may be observed include, without limitation, cellular and Wi-Fi traffic volumes, which applications are running in the network 99, which users are active in the network 99, various congestion situations, and a number of users in the network 99. Example configuration parameters of the ISW network 99 that may be adjusted by the ISW-PF 100 include, without limitation, quality of service (QoS), measurement periods, transmit power, admission control, user permissions, offloading polices (e.g., packet filters), or the like. As described further below, the ISW-PF 100 can be deployed as a standalone logical function in the ISW network 99 or integrated with another component in the ISW network 99, such as a Wireless LAN Controller (WLC), an ISW gateway (GW) 102 (e.g., see FIG. 9), or an HeNB GW for example.

Figure 2:
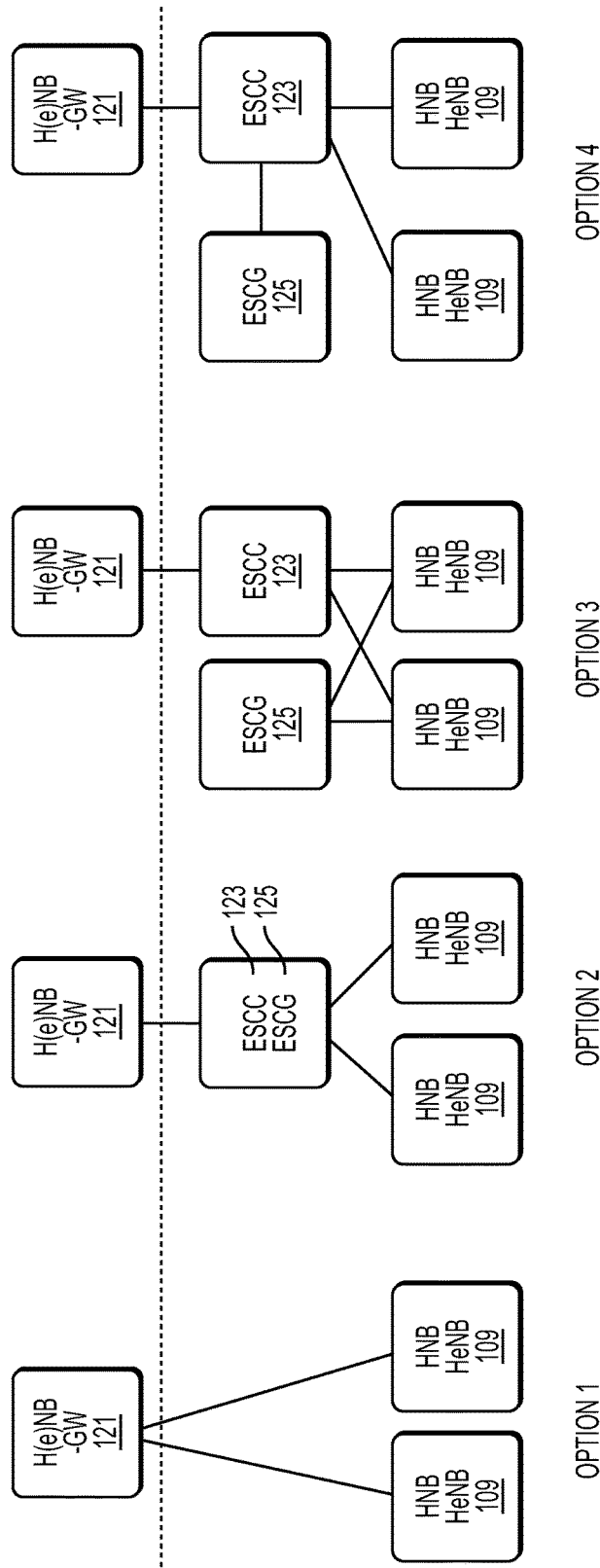
FIG. 2 is a block diagram that depicts example deployment options for small cell networks.

By way of background, referring to FIG. 2, the small cell forum enterprise architecture document has introduced new logical entities for small cell deployments, the Enterprise Small Cell Concentrator (ESCC) 123 and Enterprise Small Cell Gateway (ESCG) 125. The ESCC 123 and ESCG 125 reside in the integrated small cell network. For example, they can reside within the enterprise in an enterprise's small cell deployment. The ESCC 123 is an aggregation point for signaling and the ESCG 125 is an aggregation point for data plane communication. The ESCG 125 may include a Local Gateway (L-GW). Referring to FIG. 2, FIG. 2 shows four deployment options in which the Enterprise Small Cell Concentrator (ESCC) 123 and the Enterprise Small Cell Gateway (ESCG) 125 reside between the HeNB's 109 and the HeNB-GW 121. As shown, option 1 is a legacy deployment that does not include a ESCC or ESCG. In some cases, the ESCC 123 can present itself to the evolved packet core (EPC) as a single Virtual FAP. There may be multiple HeNB's 109 behind the ESCC 123, but the EPC only "sees"

one HeNB 109. Thus, the enterprise network can scale by adding (or removing) HeNB's 109 without involving the EPC.

The management plane refers to network traffic that relates to, but is not limited to, Configuration Management (CM), Fault Management (FM), and Performance Management (PM). Configuration Management includes items such as, for example, firmware upgrades, definitions of subscriber groups, security parameters, and operating parameters that may be at least somewhat static. Fault management refers to condition alarms or messages that indicate network problems. Performance management refers to diagnostic reports that describe general network conditions. In some cases, management plane traffic tends to be delayed (not real-time). In other words, management plane configuration can be defined as being semi-static.

The control plane refers to network messaging traffic that can related to various devices such as a user equipment (UE), HeNB, or a Small Cell control device. Control plane traffic can be dynamic or substantially real time. Tracking area updates, paging requests, and broadcasts that carry system information are examples of control plane traffic.

By way of example, a management plane operation at startup of an HeNB may indicate that "It is acceptable for the HeNB transmit power to be between X and Y". Control plane operation may dynamically adjust the HeNB's transmit power based on network conditions. In some cases, the line between what is considered control plane and management plane is not clear. For example, QoS policies related to IP flows are often considered to be something that is handled over the control plane in a 3GPP network. However, QoS for Wi-Fi access points can be handled over the management plane. Wireless LAN controllers can configure per-flow QoS to/from Wi-Fi access points using the control and provisioning of wireless access points (CAPWAP) management protocol. A Home eNodeB Management System (HMS) can use the TR-069 management protocol to configure QoS rules in an HeNB. Embodiments described herein may further blur the line between the control plane and the management plane. For example, various embodiments include dynamically configuring parameters that a have been traditionally part of the management plane.

Figure 3:
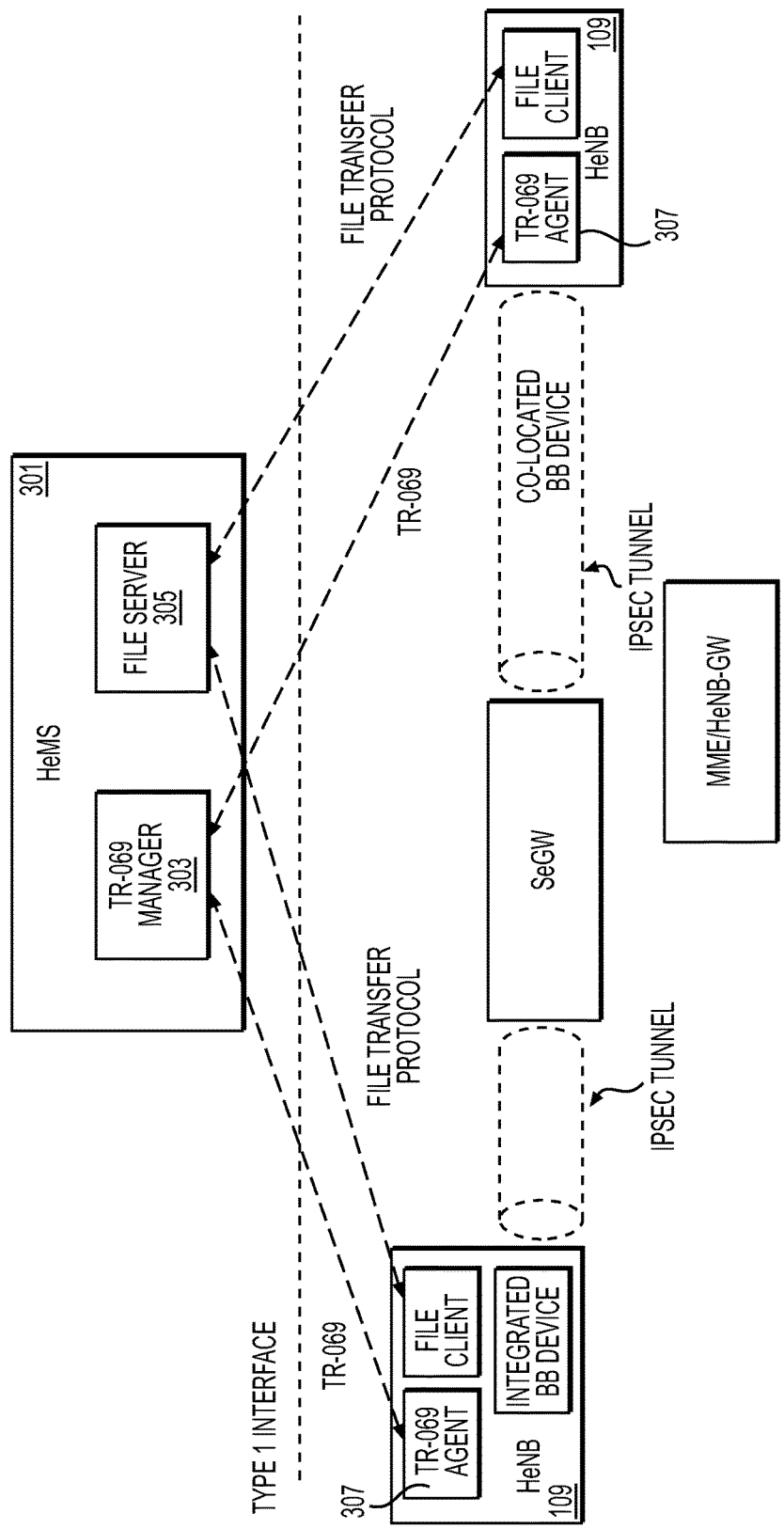
FIG. 3 is a block diagram of an example Home Enhanced NodeB (HeNB) management architecture.

By way of background, FIG. 3 shows an example of a Home eNodeB Management System (HeMS) 301 that can manage multiple HeNB's 109. HeNB's 109 are managed by the Home eNodeB Management System (HeMS) 301 that resides in the EPC and is operator owned. Each HeNB 109 can be managed independently by the HeMS 301 as show in FIG. 3. The HeMS 301 can include a TR-069 Server (manager) 303 and a file server 305. The file server 305 may be used for file uploads or downloads related to HeMS management, such as an upload of performance measurement files or alarm logs for example, as configured by the TR-069 Manager. It will be understood that the file server may also be used by the network operator for other purposes. TR-069 is the management protocol that is used by the HeMS 301 for Configuration Management (CM), Fault Management (FM), and Performance Management (PM) of the HeNB 109. The TR-069 protocol is defined in TR-069. Referring to FIG. 3, the TR-069 Manager 303 that resides in the HeMS 301 is a TR-069 Auto Configuration Server (ACS). A TR-069 Agent 307 that resides in the HeNB 109 is a TR-069 Customer Premises Equipment (CPE). 3GPP published a data model for HeNB's in TS 32.592, Telecommunication management; Home enhanced Node B (HeNB) Operations, Administration, Maintenance and Provisioning (OAM&P); Information model for Type 1 interface HeNB to HeNB Management System (HeMS). 3GPP published a data model for HNB's in Enterprise Small Cell Architectures, Small Cell Forum. The information in the 3GPP publications was absorbed into the TR-196 data model. TR-196 also supports CDMA2000 femto cells that are based on input from TIA. It will be understood that the TR-196 is not a protocol, but a data model that is used to describe a femto access point.

Figure 4:
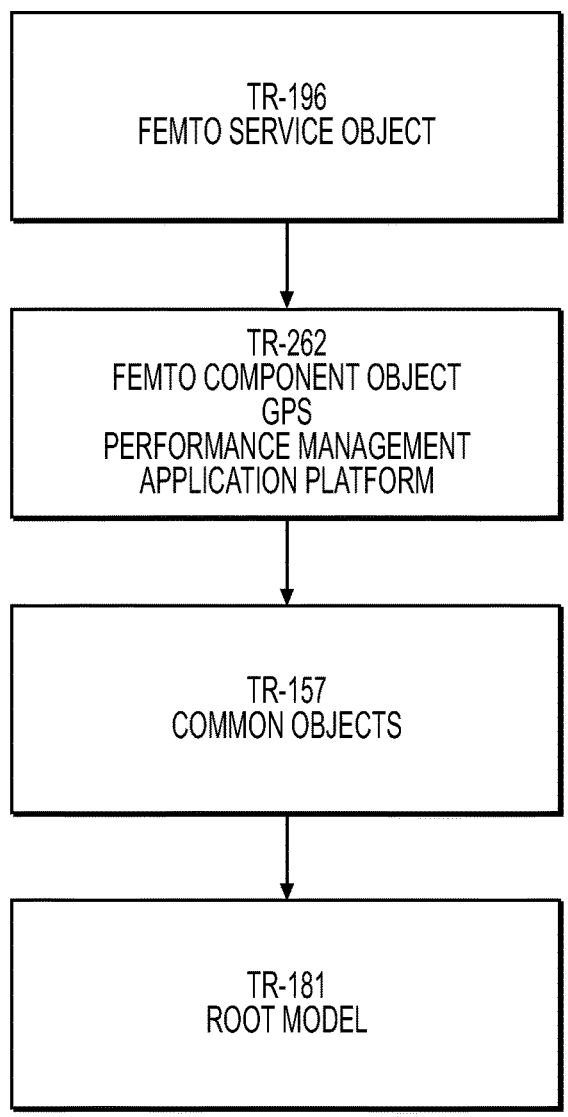
FIG. 4 depicts a femto device data model.

TR-069 data models can be used to build other data models, like a data structure for example. As shown in FIG. 4, a femto access point data model 401 actually may be equivalent to TR-196+TR-262+TR-157+TR-181. TR-196 contains most of the cellular specific items. The other data models are used to manage other aspects of the platform.

Control and Provisioning of Wireless Access Points (CAPWAP) is an IETF protocol that is defined in RFC 5415, Control and Provisioning of Wireless Access Points (CAPWAP) Protocol Specification. CAPWAP is a generic protocol that defines how to perform device and configuration management on wireless access points. The protocol requires that a binding be created for each type of wireless access point that uses the protocol. The binding defines the various configuration fields and device control fields that can be set via the CAPWAP protocol. The IETF created a binding for IEEE 802.11 access points in reference RFC 5416, Control and Provisioning of Wireless Access Points (CAPWAP) Protocol for IEEE 802.11.

Simple Network Management Protocol (SNMP) is an IETF protocol that is defined in RFC 3411 to RFC 3418 Simple Network Management Protocol (SNMP). SNMP describes a protocol for monitoring networked devices from one or more centralized administrative servers, called a Network Management System (NMS). The NMS provides applications that can be used by the network managed manager (e.g., an IT department) to manage network devices. Network devices run software, which can be referred to as SNMP agents that interface with the NMS to send and receive management information. Similar to TR-069, SNMP does not define what values or parameters are managed. Instead, SNMP relies on management information bases (MIBs) that are defined for each type of networked device.

It is recognized herein that, although they have the same general purpose, CAPWAP and SNMP are very different. SNMP is used to describe a complete system configuration and is more general as compared to CAPWAP. CAPWAP is restricted to the control of wireless access points. A common architecture implements SNMP to manage a wireless LAN controller (WLC) and the WLC uses CAPWAP to manage lightweight Wi-Fi access points.

In Release 8, 3GPP introduced an "overlay" architecture for inter-working non-3GPP networks with the Long Term Evolution (LTE) Evolved Packet Core (EPC). The overlay architecture allowed the UE to connect to the EPC via a CDMA or WiMAX RATs. The approaches that were defined by 3GPP required that the UE support IPSec and DSMIPv6 to create a tunnel to the EPC. Although the architecture required UE enhancements, it avoided any impact to the non-3GPP network.

In Release 11 (R11), 3GPP added support for interworking with Wi-Fi networks. Prior to R11, the S2a interface (between the access network GW and packet data network gateway (P-GW)), supported GW's for WiMAX and CDMA networks. R11 added enhancements so that a Trusted WLAN (TWLAN) can use the S2a interface to connect to the EPC. These enhancements allow the UE to connect to the EPC, via the TWLAN, without requiring the UE to support IPSec or DSMIPv6. The TWLAN must have a Trusted Wi-Fi Access Gateway (TWAG) that supports IPSec and PMIPv6. If the UE supports SIM based authentication with the TWALN, the UE can connect to the EPC via its Wi-Fi connection. This approach avoids significant impact to the UE.

Initially, Wi-Fi offloading only allowed the UE to maintain one PDN connection. In other words, all traffic uses Wi-Fi or Cellular. The Multi-Access PDN Connectivity (MAPCON) work in 3GPP added support for simultaneously maintaining a cellular PDN connection and a Wi-Fi PDN connection.

3GPP's IP Flow Mobility (IFOM) work further enhanced the interworking capabilities of the network by allowing a PDN connection to simultaneously exist over a cellular and Wi-Fi connection. The access network is selected on a per-IP flow basis. IP flows can be moved between 3GPP and WLAN access.

3GPP's Non-Seamless WLAN Offloading (NSWO) enhancements added support for allowing traffic to be routed towards the internet without traversing the EPC. This type of offloading can be useful when the user's access does not require any EPC services, such as when the user is simply browsing the internet for example. The EPC may download polices to the UE for directing how MAPCON, IFOM, and NSWO traffic should be routed.

Table 1 below summarizes the aforementioned enhancements that were added in each work item.

TABLE 1

| 3GPP Work Item | Simultaneous Wi-Fi and Cellular | Offload per-PDN Connection | Offload per-IP- Flow | Traffic Bypasses the EPC |
|---|---|---|---|---|
| Basic TWLAN Access | No | No | No | No |
| MAPCON | No | Yes | No | No |
| IFOM | Yes | Yes | Yes | No |
| NSWO | Yes | Yes | Yes | Yes |

3GPP's Selective IP Traffic Offload (SIPTO) work allows the core network to select a packet data network gateway (P-GW) based on the physical location of the user. The enhanced selection method can be used to shorten the path between the UE's base station and P-GW, thus allowing for more efficient routing of data.

Figure 5:
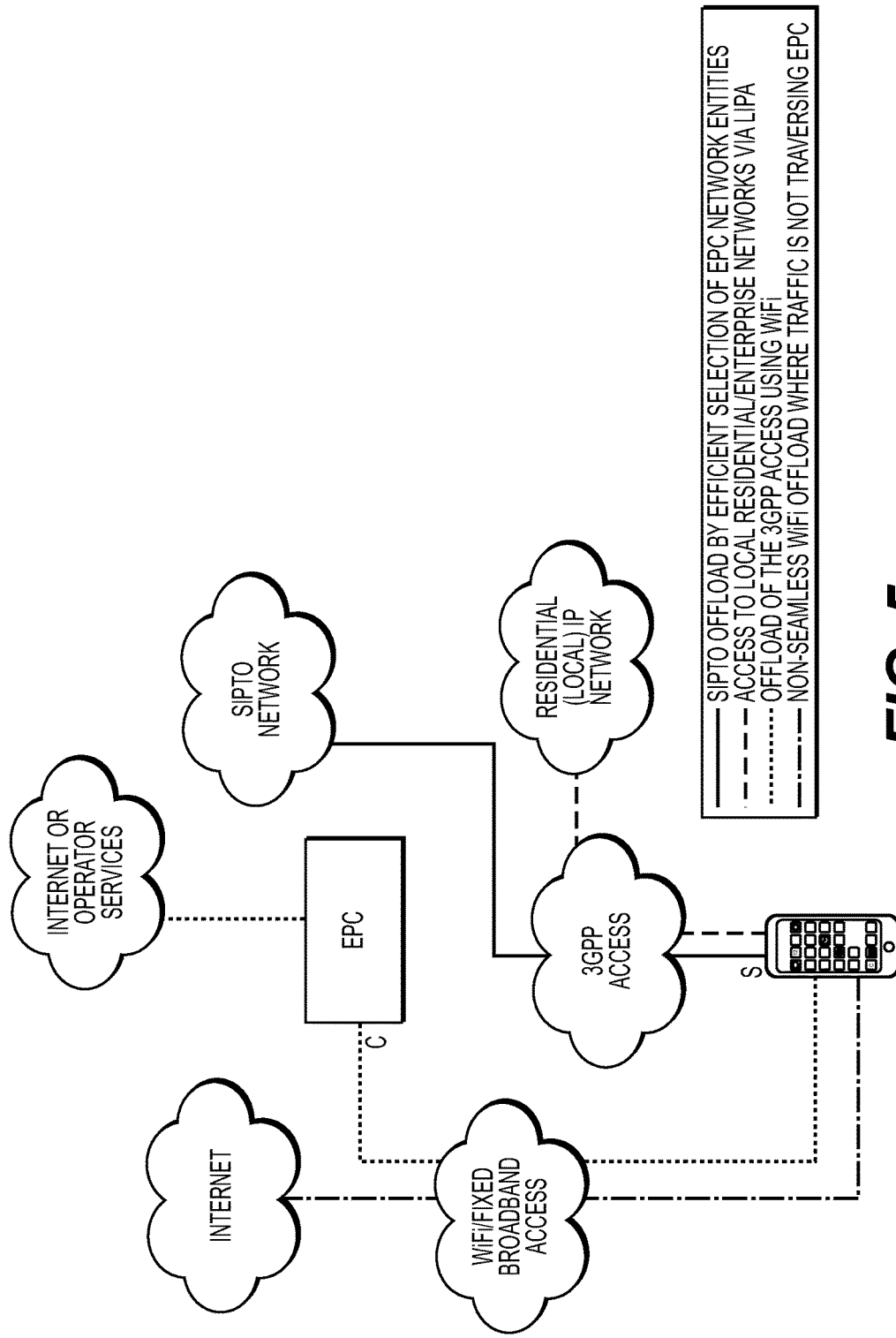
FIG. 5 is a block diagram that shows example approaches used by a core network and radio access network (RAN) to offload services.

3GPP's Local IP Access (LIPA) architecture created a new logical entity called the L-GW (Local GW). The L-GW is located in a local network with an HeNB (small cell). The L-GW behaves like a P-GW in the local network and provides the UE with access to the local IP network. Thus, the UE can access the local IP network without accessing the EPC. FIG. 5 shows an example comparison of some of the RAN and Core Network offloading approaches that were discussed above.

Figure 7:
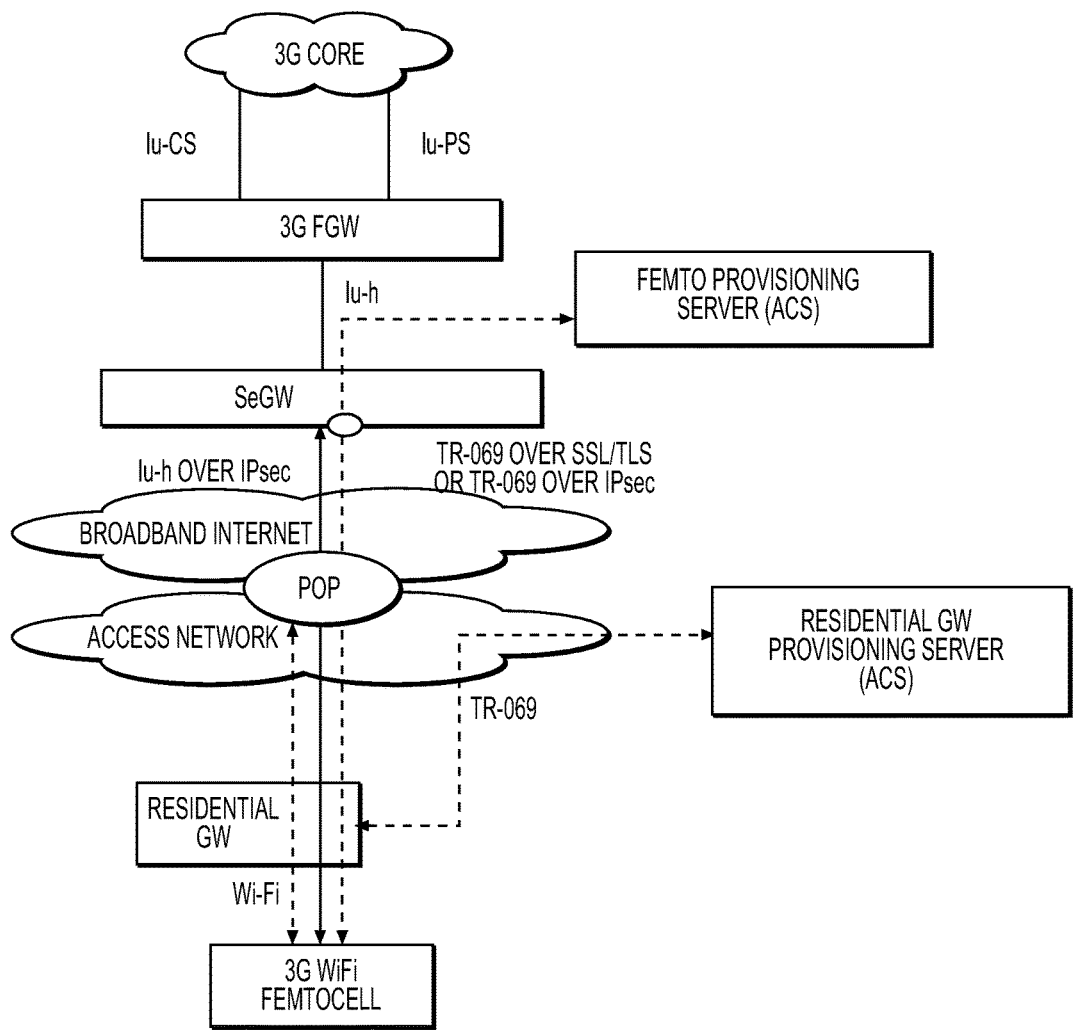
FIG. 7 is a system diagram that shows a femto and Wi-Fi network including respective provisioning systems.

As discussed above, the HeMS cannot efficiently react to certain network conditions, such as congestion in Wi-Fi access points for example. As shown in FIG. 7, the provisioning systems for the Femto and Wi-Fi are currently distinct.

As further discussed in above, the Small Cell Forum's NET working group has introduced a new logical entity called the Enterprise Small Cell Concentrator that can present itself to the EPC as a single Virtual FAP. Because the concentrator presents itself as a single, virtual HeNB to the EPC, the HeNB's cannot be directly managed by the HeMS in the EPC. Additionally, it is recognized herein that the EPC should be able to distinguish a Virtual FAP from a physical HeNB. This distinction may be important, for example, because PM, CM, and FM are performed differently for Virtual FAP's as compared to HeNB's.

The fact that existing architectures are not tightly integrated can present problems when considering how end-to-end QoS can be provided for data flows that originate behind a small cell or Wi-Fi AP and terminate in the EPC. For example, when the application server (AS)/service capability server (SCS) sets up a data flow with the PCRF, the AS/SCS provides QoS requirements for the flow to the PCRF. The PCRF may use existing EPC procedures to set up the QoS for the GTP tunnel and bearers that carry the flow. The PCRF may share the QoS requirements with the back haul network via an S9a interface with the broadband carrier's BPCF. However, it is recognized herein that there is currently no mechanism in place for the ISW network to indicate to the EPC whether or not the QoS requirements can be met in the local network. In other words, referring to FIG. 6, when a data flow is terminated at the EPC, there is no way to guarantee the QoS of a data flow between the UE (e.g., a mobile phone or laptop) and the Back Haul Gateway.

Figure 6:
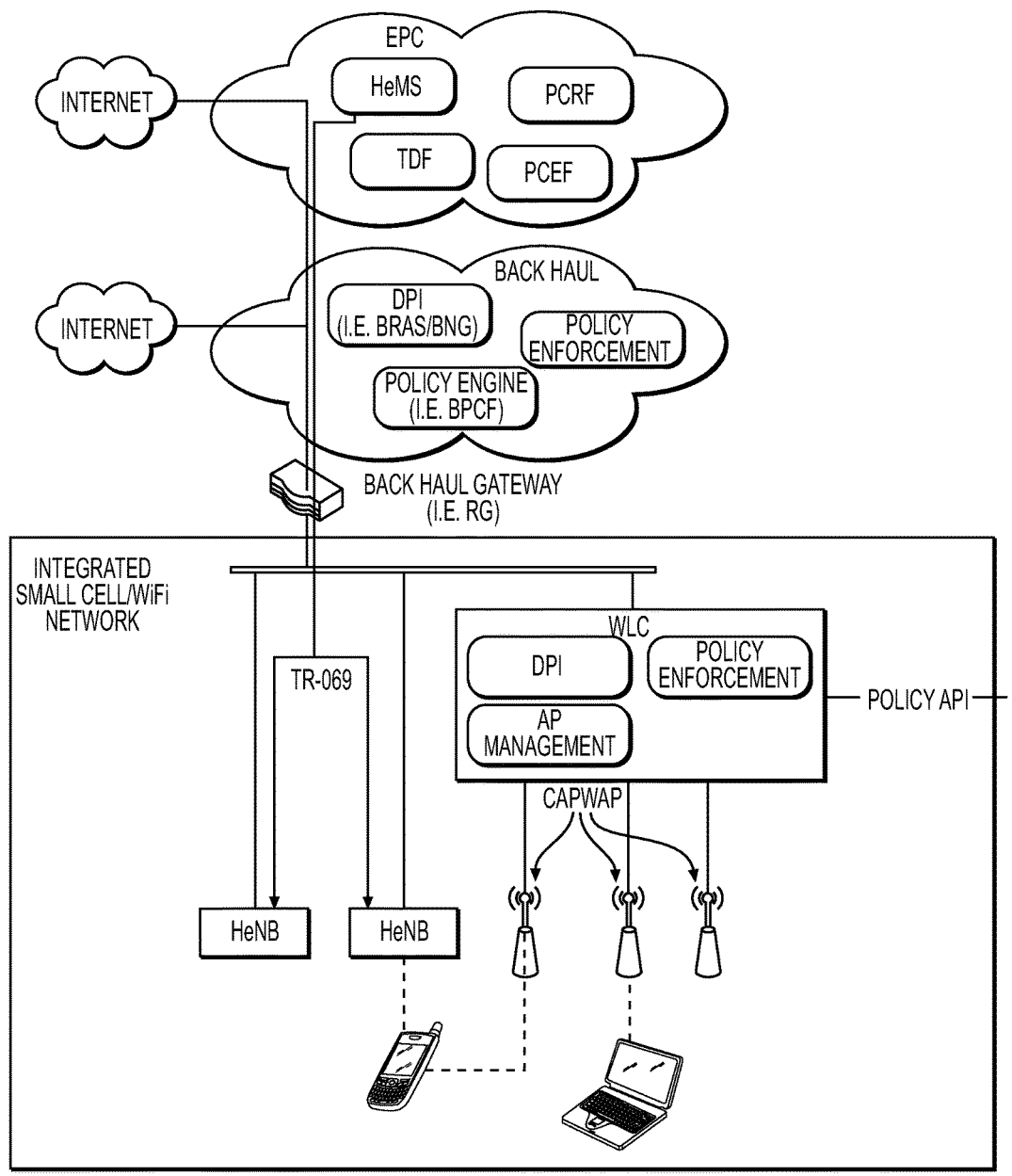
FIG. 6 depicts an example ISWN architecture showing disjointed policy and management enforcement.

In a typical current configuration, such as the example configuration depicted in FIG. 6, HeNB Small Cells are managed by a central entity in the core network called a Home eNodeB Management System (HeMS) and Wi-Fi access points are managed by an central entity in the local network called a Wireless LAN Controller (WLC).

Figure 1:
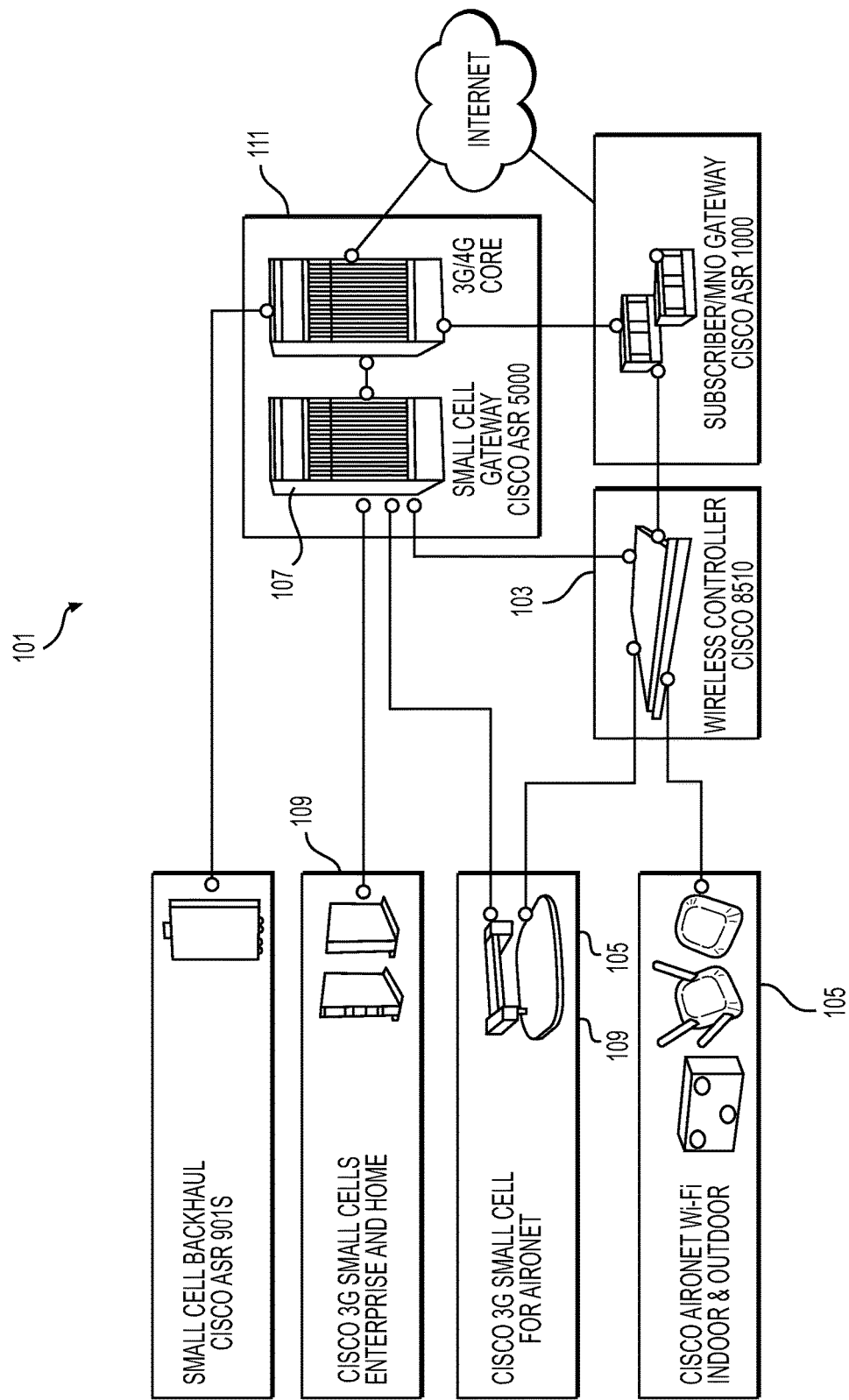
FIG. 1 is a system diagram of an example integrated small cell Wi-Fi network (ISWN)

Referring now to FIGS. 8-20 generally, an integrated small cell/Wi-Fi (ISW) management entity, for instance the ISW-PF 100, can provide management services to the ISW network 99. As further described below, the ISW-PF 100 can manage network resources more efficiently as compared to how resources are managed in a segmented HeMS/WLC architecture (e.g., see FIG. 1). Referring to FIG. 8, an example ISW architecture 99 is shown that includes the ISW-PF 100 that may collect management and policy information from several independent sources, such as an enterprise IT department 104, a mobile network operator (MNO) 106, an application server (AS) 108, a backhaul operator 110, a user equipment 112, or computing device 114. It will be understood that management and policy information may be received from any other appropriate source as desired.

As used herein, management information may refer to configuration management (CM), fault management (FM), or performance management (PM) information for small cells, for instance an HeNB 126, and a Wi-Fi AP, for instance Wi-Fi AP's 118. By way of example and without limitation, management information may indicate an acceptable transmit power, a closed subscriber group information, frequency bands, neighbor lists, or the like. Policy information may refer to QoS, for instance QoS per flow or per application, and rules that may be applied based on traffic monitoring and/or deep packet inspection.

Figure 9:
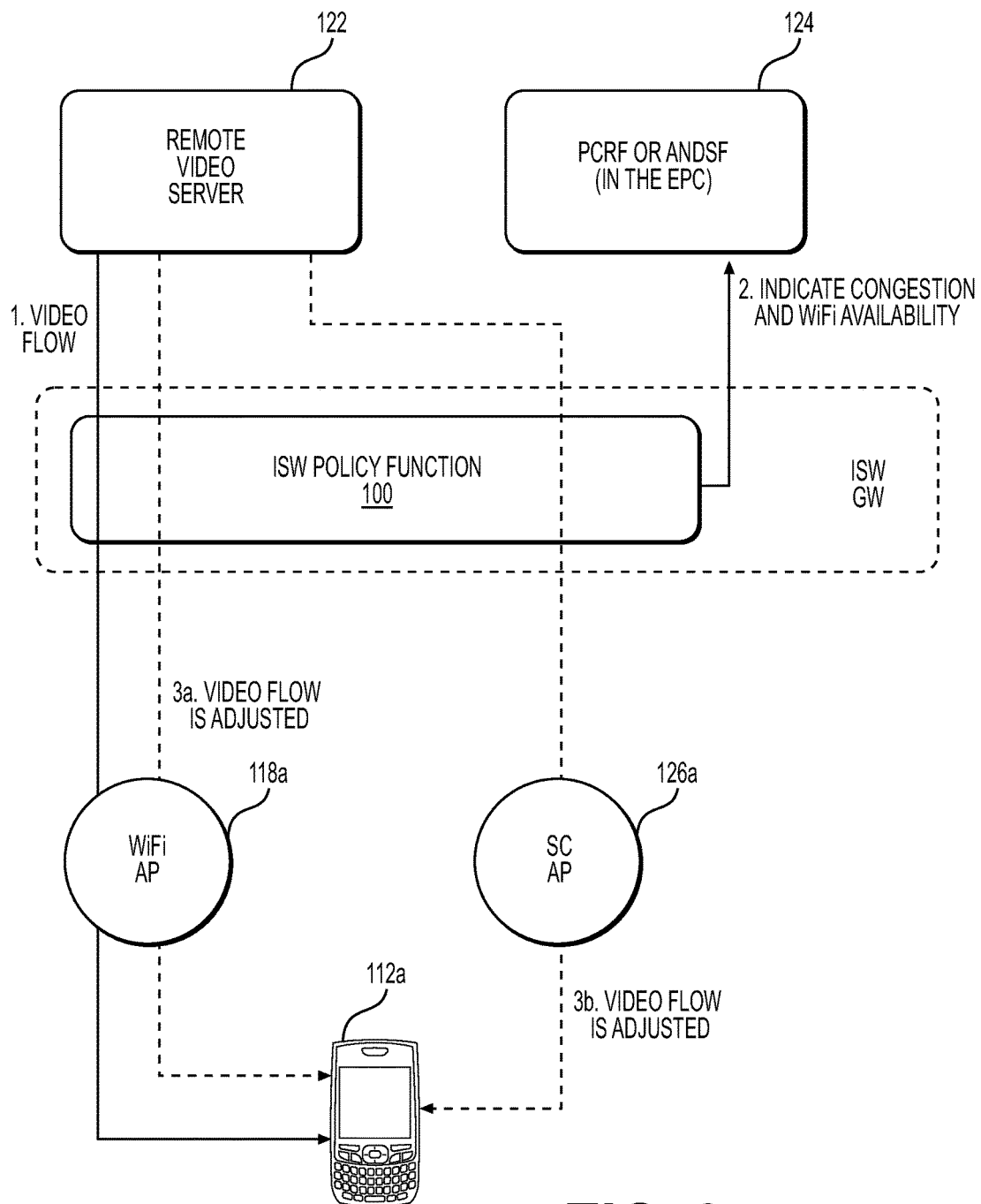
FIG. 9 is a flow diagram that shows an example of quality of service (QoS) conflict resolution using the ISW policy function in accordance with an example embodiment.

Referring also to FIG. 9, a use case is depicted to further illustrate an example implementation of the ISW-PF 100. Referring to the example depicted in FIG. 9, a UE 112a in an enterprise is streaming video from an application Server (AS) 122, which can also be referred to as a remote video server 122. In the depicted example, as further described below, the AS 122 has a relationship with the MNO and uses an interface with the MNO (e.g., an Rx interface to a policy and charging rules function (PCRF) 124) to configure a guaranteed bit rate (GBR) bearer that can be used to stream the video. The MNO may allow this because the core network has sufficient bandwidth available to support the GBR bearer.

Thus, the enterprise owner may configure a policy whereby video streaming traffic is throttled when the Enterprise network is close to, for instance meets, a congestion condition. When congestion occurs in the enterprise network, it is recognized herein that a function may be needed to resolve a conflict between a QoS that is desired by the MNO and a QoS that is desired by the Enterprise owner. Further, when this type of conflict is resolved, a report of the conflict, for instance a report that includes how the conflict was resolved, is provided to the MNO and Enterprise IT department in accordance with an example embodiment.

Referring to FIGS. 8 and 9, the integrated policy function 100 resolves policy conflicts in the ISW network 99. For example, the ISW-PF 100 may resolve the policy conflict by throttling data flow or by not allowing the data to flow at all. Referring in particular to FIG. 8, the ISW-PF 100 may use its interface with the MNO 106 or the backhaul operator 110 to inform the MNO 106 or the backhaul operator 110 that the QoS that was promised to an AS, Device 114, or UE 112 cannot be provided. The ISW-PF 100 may also use its interfaces to suggest a different QoS. By way of example, if the interface between the ISW-PF 100 and the MNO 106 is based on the S9a Diameter application that is described in TS 29.215, Policy and Charging Control (PCC) over S9 reference point; Stage 3, then a credit-control-request (CCR) command may be used to inform the MNO 106 that QoS for the session should be modified (e.g., see FIG. 12).

Figure 14:
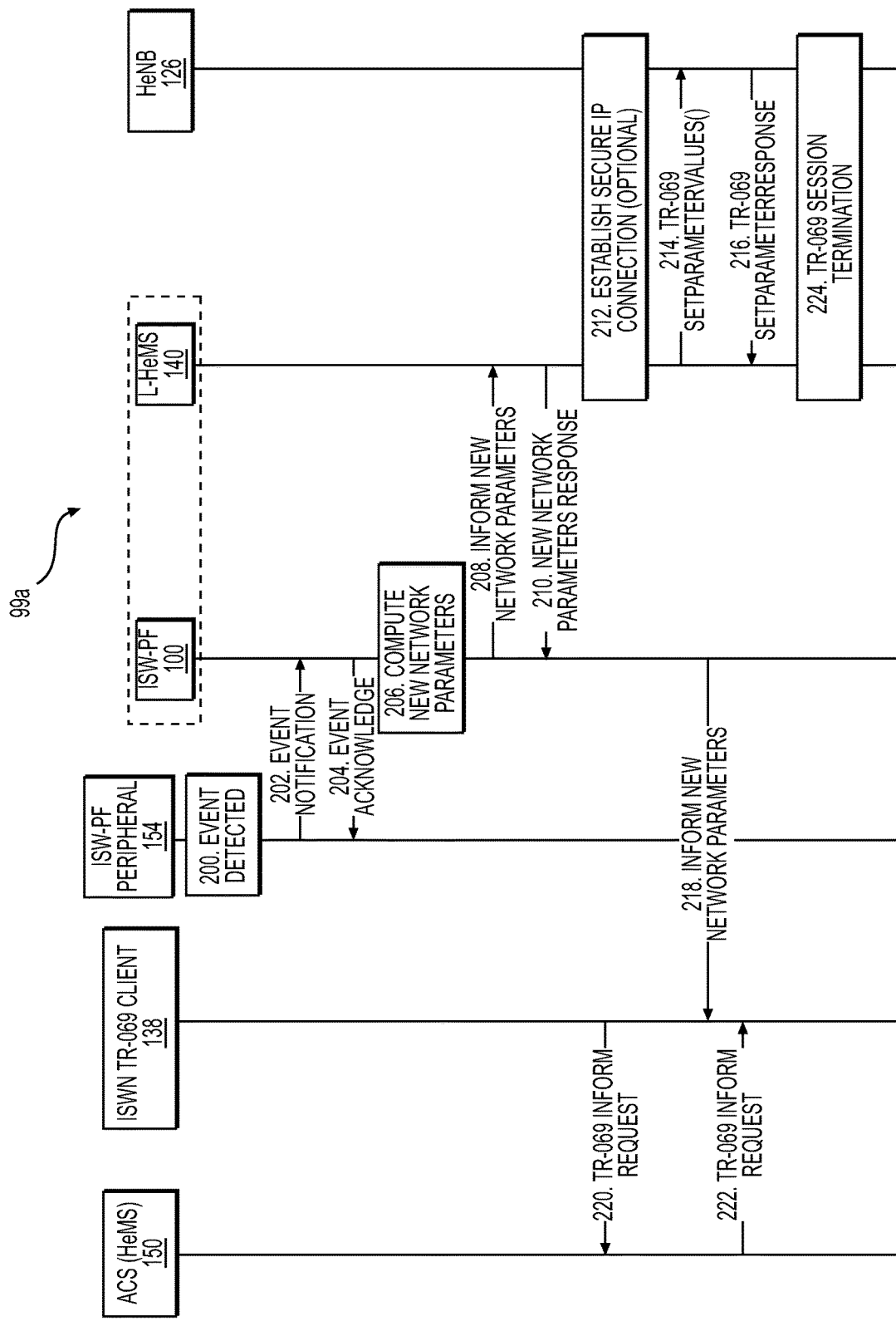
FIG. 14 is a flow diagram that shows the ISW policy function interacting with a small cell network via an (L-HeMS) interface in accordance with an example embodiment.
Figure 15:
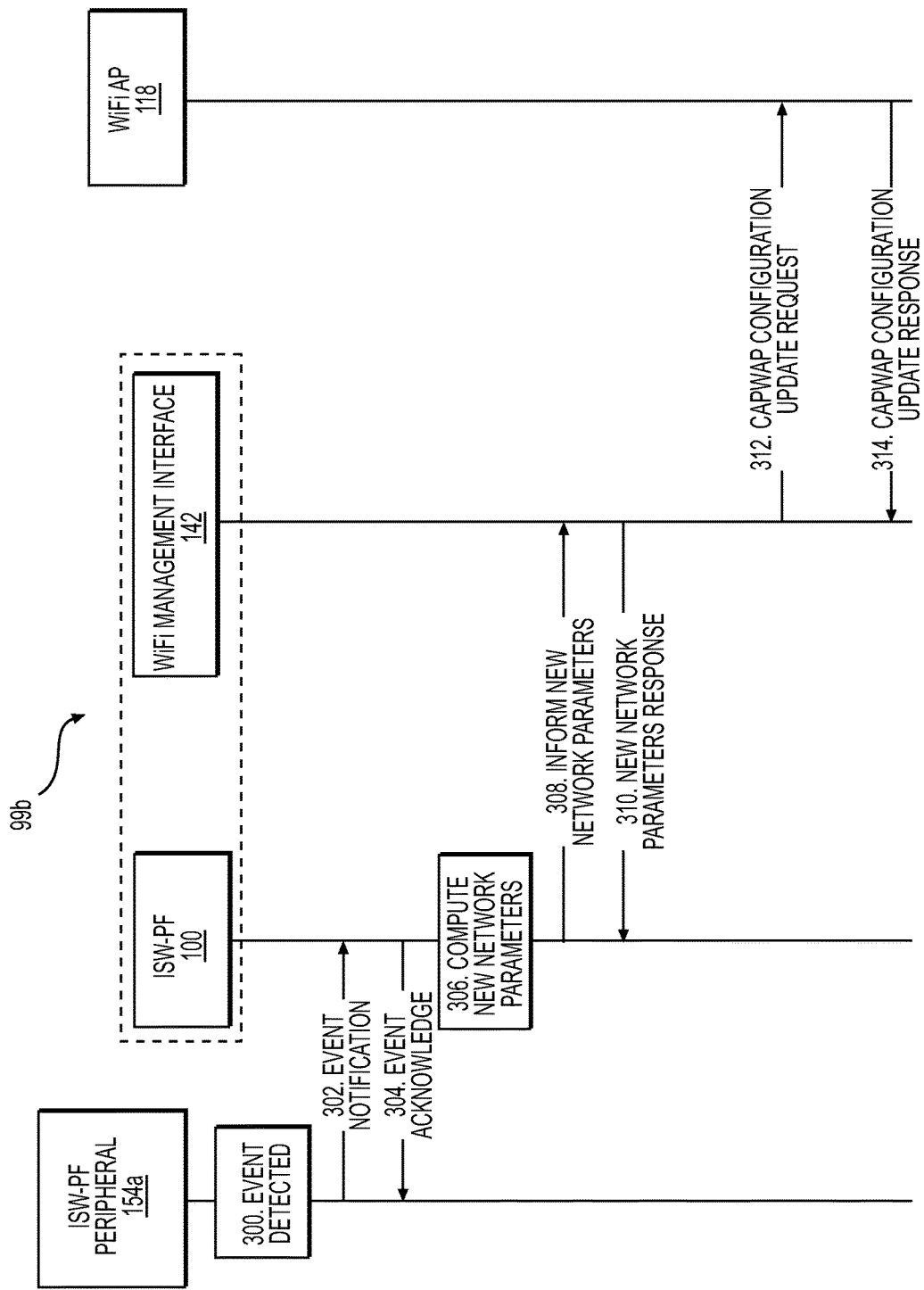
FIG. 15 is a flow diagram that shows the ISW policy function interacting with a small cell network via Wi-Fi management interface in accordance with another example embodiment.
Figure 16:
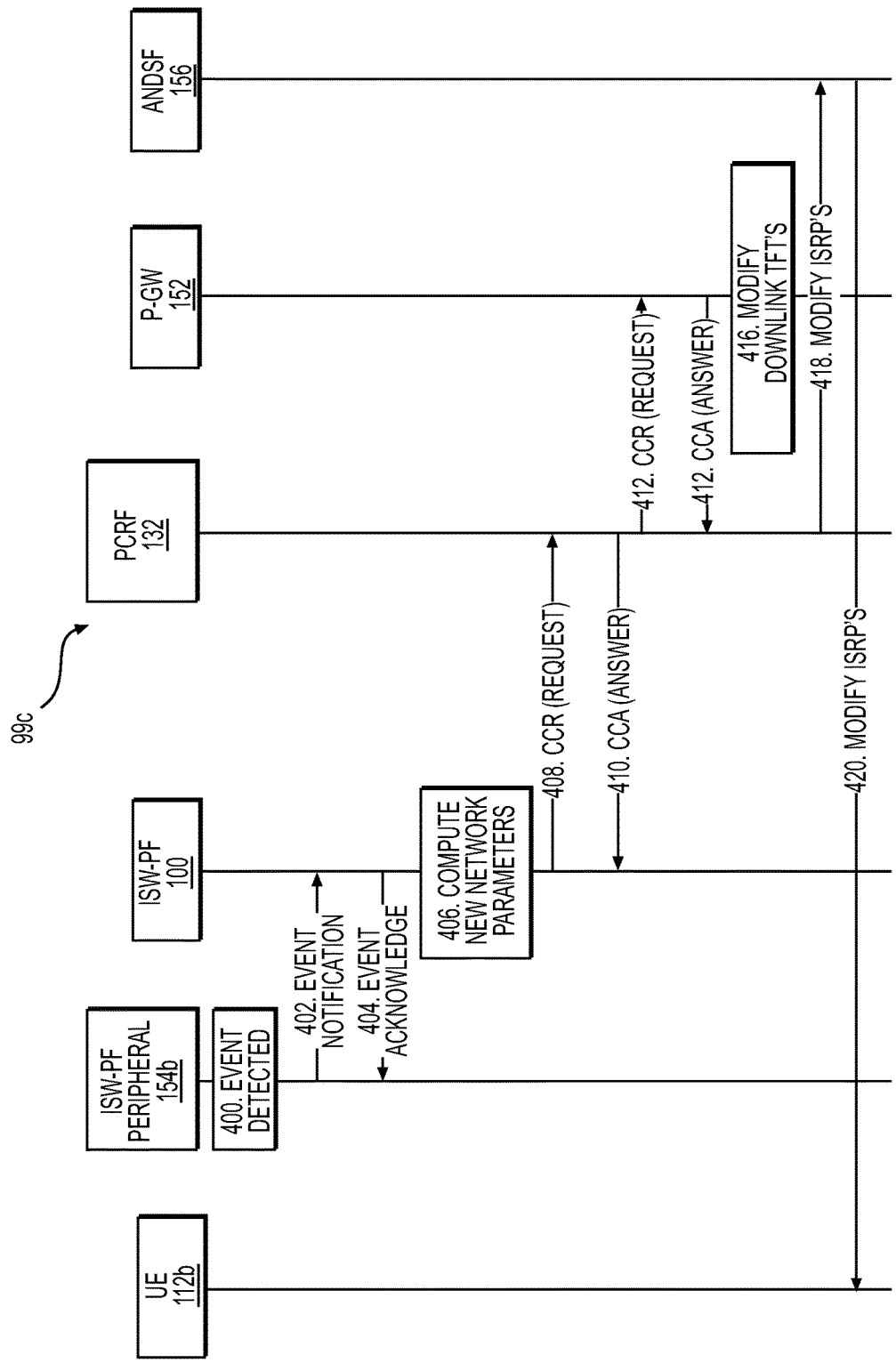
FIG. 16 is a flow diagram that shows the ISW policy function and a policy and charging rules function interacting with each other in accordance with an example embodiment.

Referring in particular to FIG. 9, the above-described video streaming example is illustrated. At 1, user/UE 112a streams video. The policies that the UE 112a previously downloaded may cause the video to stream entirely over Wi-Fi, and in particular via a Wi-Fi AP 118a. At 2, in accordance with the illustrated example, the ISW Policy function 100 determines that the Wi-Fi network is congested and indicates to the PCRF 124 that an adjustment is required. The ISW-PF 100 may determine that the network is congested in various ways. By way of example, and not by way of limitation, the ISW-PF 100 may determine that the network meets a congestion condition by observing the volume of traffic on the Wi-Fi interface, observing the number of dropped packets on the Wi-Fi interface, monitoring the number of users on the Wi-Fi interface, etc. At 3a and 3b, the video data flow is adjusted. The EPC, and in particular the PCRF 124, moves at least a portion of the data over a Small Cell AP 126-a, which uses a cellular RAN. Alternatively, if the local ISW network's wire line infrastructure is congested for example, the flow may be moved to the macro cellular network. The call flows depicted in FIGS. 14-16 illustrate the above examples in more detail.

As discussed above, moving flows between Wi-Fi and cellular radio access technologies (RATs) have been introduced by 3GPP. However, it is recognized herein that the infrastructure that is currently supported by 3GPP only supports the provisioning of semi-static offloading policies. Thus, the UE and local network are not able to react to changing conditions in the local network. Embodiments described herein allow the UE to more intelligently take advantage of the many access technologies that are available to it, such as Wi-Fi, small cells, and the macro network for example. Thus, as further described below, a given UE may not find itself in a situation where a user is getting a poor experience over Wi-Fi at the same time that the macro network has bandwidth available that could be used to provide an improved user experience. It is further recognized herein that the 3GPP standards currently only support integrated offloading when the anchor point is deep in the core network (at the P-GW). The ISW-PF as described herein is well suited for the scenario in which an integrated Small Cell/Wi-Fi GW in the local network is the anchor point for integrated offloading. The ISW-PF entity may be co-located with the ISW GW.

Figure 10:
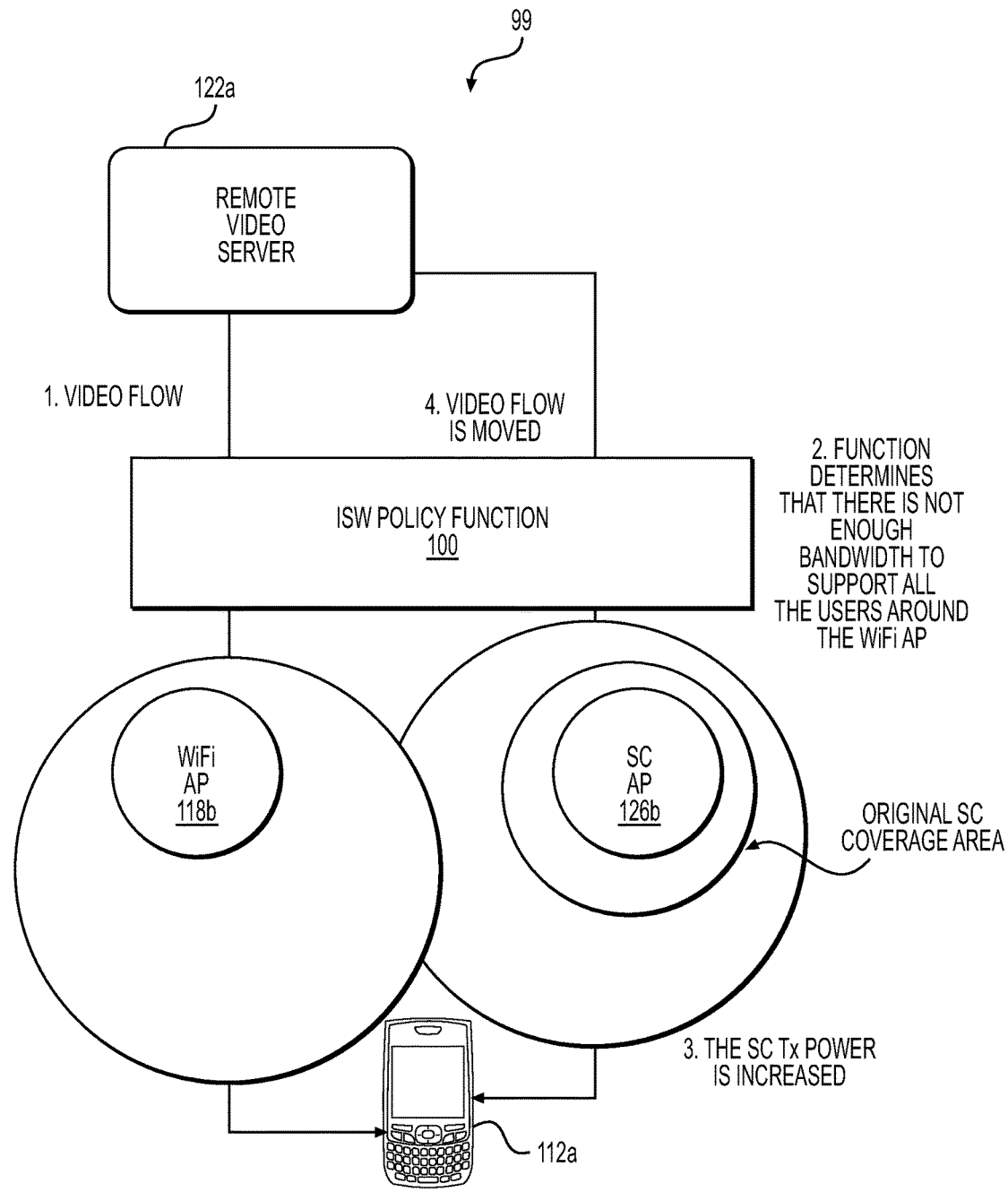
FIG. 10 is a flow diagram that shows an example of a dynamic adjustment of transmit power using the ISW policy function in accordance with an example embodiment.

Referring to FIG. 10, in accordance with another example scenario, an enterprise IT department is responsible for IT services in a multi-floor building and an adjacent parking garage. The enterprise's network is an ISW 99. Wi-Fi is used to provide internet connectivity throughout the building. The enterprise also manages one or more HeNB's 126b that are used to ensure cellular coverage in the parking garage and in the building's basement. In accordance with the example scenario, a demonstration is taking place on the second floor and Wi-Fi will be used to stream video (from a remote video server 122a) to the smart phones of several executives of a potential customer company. More executives showed up than expected so the throughput demand on the network is going to be more than what was experienced during the demo dry runs. When the demonstration starts, a policy function in the ISW (e.g., the ISW-PF 100) will detect congestion in the second floor Wi-Fi AP's. The ISW Policy function 100 my command a first floor Wi-Fi AP 118b and a HeNB 126b in the basement to increase their respective transmit powers so that they can provide coverage on the second floor. Further, the ISW-PF 100 may temporarily modify the closed subscriber group of the HeNB 126b so that some of the executives will be able connect to the HeNB 126b during this period of congestion.

The above-described example scenario is depicted in FIG. 10. As a user begins to stream video (step 1) via the UE 112a, the ISW Policy function 100 may detect a congestion situation and determine how to address the problem (step 2). In accordance with the illustrated example, the ISW Policy function 100 determines that a small cell AP 126b nearby could provide coverage to the UE 112a if its coverage area is increased, so the ISW Policy function 100 increases, for instance temporarily increases, the Tx Power of the small cell AP (step 3) 126b. The UE 112a is then able to stream video via its cellular RAN (step 4).

By way of another example scenario, the resources of an ISWN may be shared by multiple network operators. For example, if the ISWN resources are jointly owned or leased to multiple operators, then the ISW-PF 100 may reconcile the different policies that are set up by each operator. The ISW-PF 100 may apply different policies to each flow based on what network operator to which the end user subscribes. For example, if the ISWN is owned by one network operator (e.g., operator A) and leased, or shared, with other network operators (e.g., operators B and C), then the ISW-PF 100 may provide operator A with a report, or summary, of the traffic that is generated by the subscribes of network B and C. As further described below, the ISW-PF 100 may even create virtual ISWN's for each network operator that has a relationship with the ISWN. The ISWN owner can then lease a virtual ISWN to multiple network operators.

Figure 11:
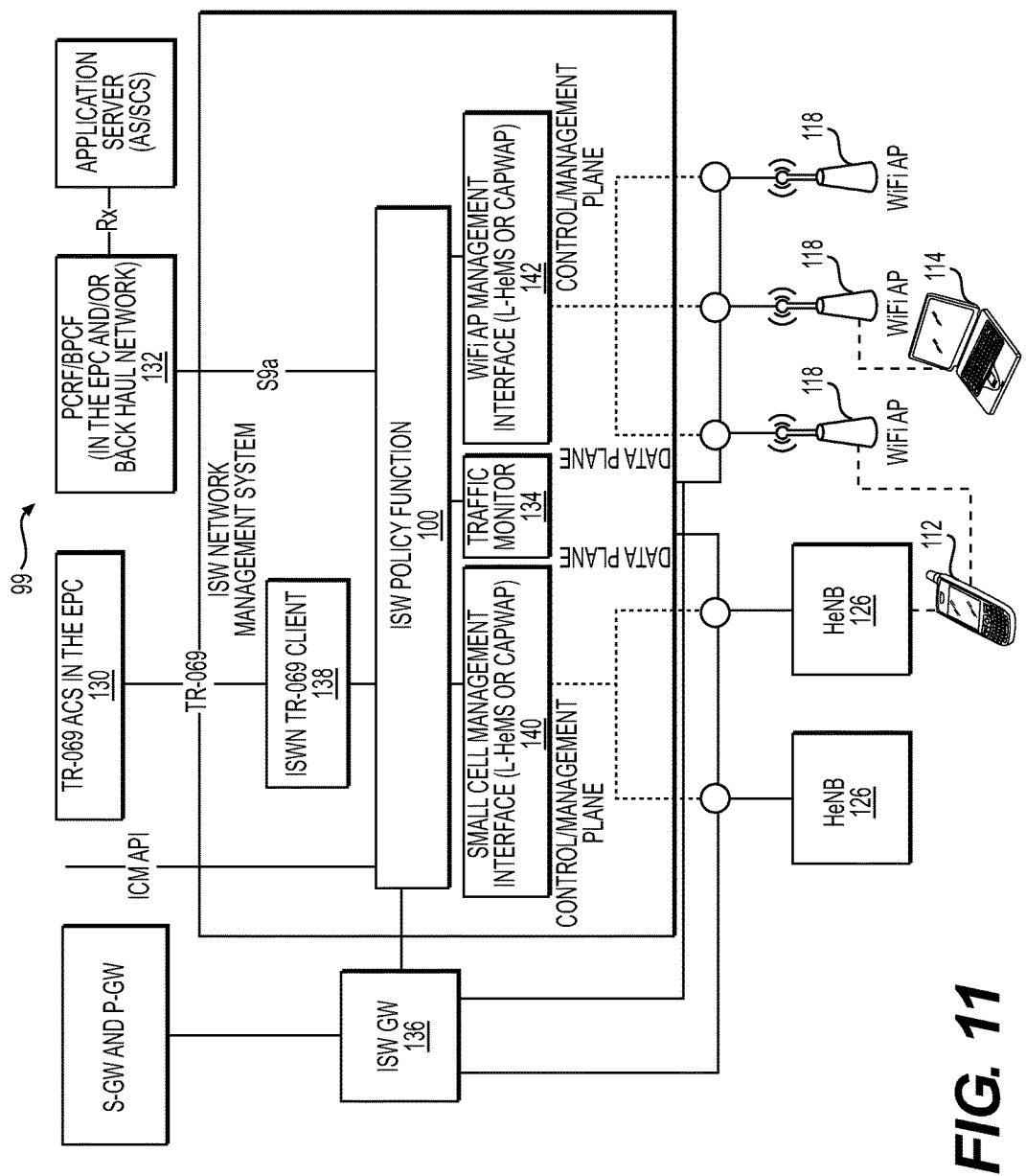
FIG. 11 is a system diagram of an ISW policy function architecture in accordance with an example embodiment.
Figure 12:
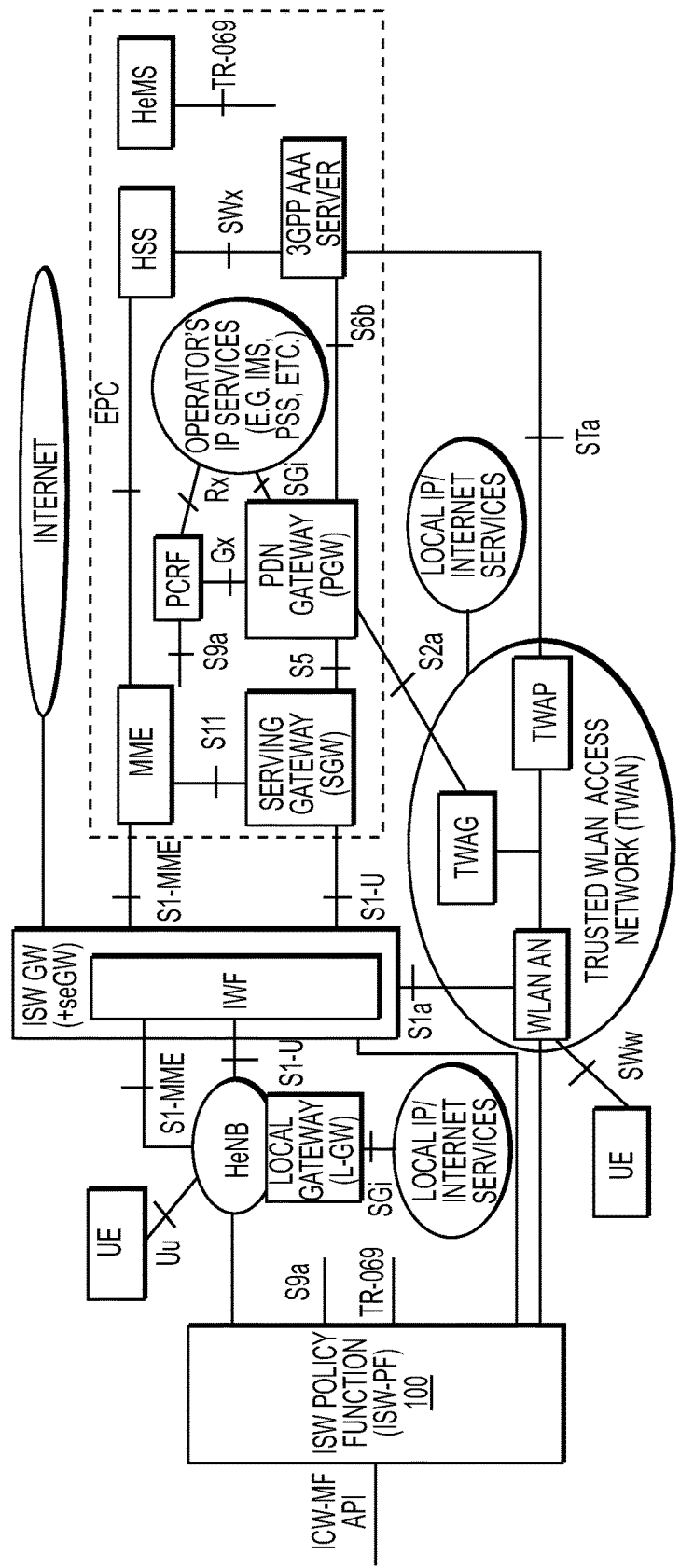
FIG. 12 is a system diagram of an ISW that includes the ISW policy function in accordance with an example embodiment.

Referring now to FIG. 11, an example management plane architecture of an ISW network 99 is shown in accordance with an example embodiment. The small cells 126 and Wi-Fi access points 118 are managed by the ISW Policy function (ISW-PF) 100. The ISW-PF 100 is able to adjust the configuration of the network's small cells and Wi-Fi access points based on observed network conditions and inputs from the following functions, present by way of example, a TR-069 HeMS ACS 130 of the MNO, a PCRF 132 of the MNO, a Policy Engine of the Back Haul Network Operator (e.g., a BPCF 132), an ISW Network Owner, an Application Provider (Remote or Local), Wi-Fi AP's 118, Small Cells 126, a traffic monitor 134 of UE 112 data through the smalls cell 126 and Wi-Fi APs 118 (e.g., via deep packet inspection (DPI)), and ISW GW 136. Referring also to FIG. 12, the ISW Policy function 100 may receive inputs indirectly from connected devices. For example, connected devices such as UE's (e.g., the UE 112) and Wi-Fi devices (e.g., the computing device 114) may provide channel quality measurements to a HeNB 126 or a Wi-Fi AP 118 and those measurements maybe forwarded to the ISW-PF 100.

The interface between an ACS-HeMS and an HeNB may be based on the TR-069 protocol as described in TR-069, CPE WAN Management Protocol, Issue: 1 Amendment 4, July 2011 ("TR-069"). The general data model that may be used for managing Femto Access Points is described in TR-196, Femto Access Point Service Data Model, Issue 2, and November 2011 ("TR-196"). TR-196 allows for the provisioning of CDMA2000, UMTS, and LTE Femto access points, or small cells. It is recognized herein that managing an ISWN TR-069 Client may require a new data model and/(or modifications to the TR-196 data model). Described below is a new data model that can support ISWN TR-069 (see Table 2). It is further recognized herein that the similar or same concepts may be used to modify the TR-196 data model.

Figure 13:
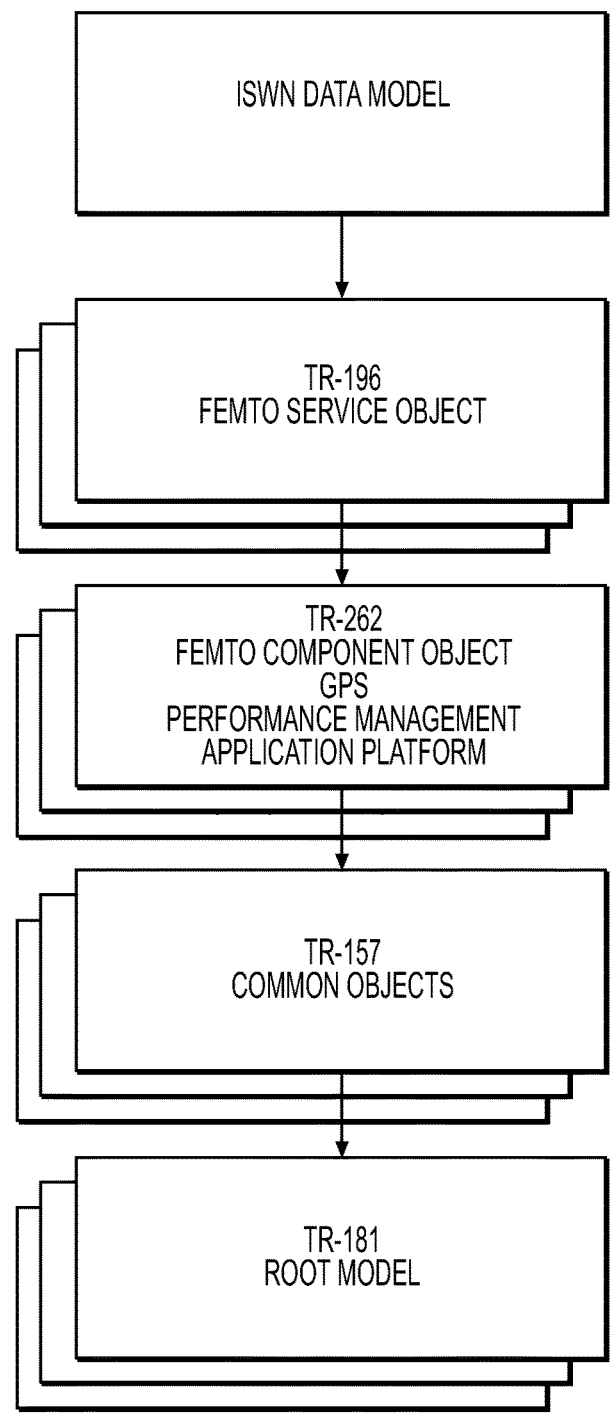
FIG. 13 depicts a data model that describes an example ISWN.

Referring to Table 2 below, Table 2 describes a data model to support an ISWN TR-069 Client. In accordance with an example embodiment, FIG. 13 shows how this new data model can be combined with other data models to describe a virtual FAP ISWN and the FAP's small cells and Wi-Fi AP's that it represents. Thus, Table 2 describes the new data model and FIG. 13 shows how the data model is aggregated with existing data models to describe a complete ISWN.

TABLE 2

| Name | Type | Description |
| --- | --- | --- |
| FAPServiceNumberOfEntries | unsignedInt | The number of entries in this table |
| FAPService.{i}. | | |
| Alias | string(64) | A non-volatile handle used to reference this instance. Alias provides a mechanism for an ACS to label this instance for future reference. |
| DeviceType | String | DeviceType will support a new value of "ISWN-FAP". |
| FemtoPhysicalDevices | unsignedInt | FemtoPhysicalDevices is a new field that indicates the number of physical femto access points (FAPs) that are managed by the ISW-PF. |
| FAPService.{i}.Capabilities | | |
| LocalPolicyEngine | Boolean | Indicates if the ISWN is associated with a local Policy Engine. |
| FAPService.{i}.Policy | | |
| LocalPolicyEngineAddress | IPAddress | IP Address of the Policy Engine in the Local Network that is associated with this ISWN. This IP Address will be used to terminate the S9a interface with the mobile network operator. |
| WiFiService.{i}. | | |
| DeviceType | String | DeviceType will support a new value of "ISWN-AP". |

TABLE 2-continued

| Name | Type | Description |
| --- | --- | --- |
| WifiPhysicalDevices | unsignedInt | WifiPhysicalDevices is a new field that indicates the number of physical Wi-Fi access points that are managed by the ISWN. |
| SSID | String(32) | The SSID to be used by the Wi-Fi AP's |
| MaxTxPower | unsignedInt | Maximum transmit power (dBm) that may be used by the Wi-Fi AP's. |

Referring again to FIG. 11, in accordance with the illustrated architecture, the ISW-PF 100 is the final arbiter of how the small cells 126 and Wi-Fi access points 118 are configured. Thus, the ISW-PF 100 may make determinations concerning how small cells (and Wi-Fi AP's) should be configured when policies conflict. For example, a site owner may attempt to configure a neighbor list, CSG members, LIPA settings, etc. that is different than what was received from the SACS. In these types of conflict scenarios, the ISW-PF 100 may decide how to configure the small cells. Thus, the ISW-PF 100 may account for the fact that the MNO who owns the small cell's licensed spectrum is entitled to control certain parameters and the enterprise IT department who owns the equipment and local network is entitled to configure certain aspects of the network.

In one example, the ISW-PF 100 obtains the MNO's Small Cell Management settings from a TR-069 Client 138. The TR-069 client 138 may store the settings in a file(s) (e.g. an XML file(s)) and allow the ISW policy function 100 to read the values in the file(s) or deliver the entire file(s) to the ISW-PF 100. The ISW-PF 100 may consider these settings, along with settings that were received from the enterprise IT department via the ISW-PF API for example, when configuring the Small Cells 126 and Wi-Fi access points 118 in the ISW.

Traditionally, small cells are managed by a TR-069 ACS (e.g., an HMS or HeMS) that is located in the core network and has little or no awareness of the local network conditions, thus management is not dynamic or real time. In the architecture depicted in FIG. 11, the ISW-PF 100 can reconfigure the small cells 126 as network conditions change via a small cell management interface 140. The ISW-PF 100 may allow the small cells 126 to be managed in a way that is local-network aware and dynamic. The interface 140 that is used by the ISW-PF 100 to control the small cells 126 is described in more detail below.

Still referring to FIG. 11, the TR-069 Client 138 may present itself to the SACS as a single client that can be used to configure an entire network, for example, that is built with small cells and Wi-Fi AP's. The TR-069 data model that is used between the SACS and ISWN TR-069 Client is different than the Femto Access Point Data model that is described in TR-196. These differences are described herein.

The ISW-PF 100 may use the information that is obtained from the ISWN TR-069 Client 138 to control the HeNB's 126. The ISW-PF 100 may use TR-069 to control the HeNB's 126. The ISW-PF 100 may support a Local HeMS (L-HeMS). In this example, the interface between the L-HeMS and HeNB's may be TR-069 and uses the TR-196 data model. The L-HeMS may present itself to the HeNB's as an HeMS, but the L-HeMS may provide additional functionality to the ISW as compared to what is provided by an HeMS. For example, the HeMS may provide the ISWN TR-069 Client 138 with a range of acceptable transmit power values or operating frequencies and the ISW-PF 100 may use the L-HeMS to provide the HeNB 126 with more optimal settings, based on the ranges that were provided by the HeMS and based on local network conditions.

The ISW-PF 100 may use the L-HeMS to dynamically reconfigure the small cells based on changing network conditions. For example, FIG. 14 shows an example of a ISW-PF Peripheral 154, which can be implemented by the Traffic Monitor 134 (which can also be referred to as a Traffic Manager 134) detecting an event, such as a high bandwidth Wi-Fi user moving towards the edge of the ISW network for example. The ISW-PF 100 can use this event information to calculate new configuration parameters for a nearby small cell and use the L-HeMS to send real time management commands to the small cell.

In an alternative embodiment, CAPWAP can be used to manage the Small Cells instead of TR-069. In this type of embodiment, the Small Cell Management Interface 140 may use CAPWAP to send configuration data to the small cells. A new CAPWAP binding may be established for managing small cells. The new binding may be based on the fields that are defined in the TR-196, TR-262, TR-157, and TR-181 data models.

Referring to FIG. 14, an example ISWN 99*a* includes an ACS 150, for instance an HeMS 150, the ISWN TR-069 client 138, the ISW-PF 100, a small cell management interface 140 (which for purposes of example is a local HeMS, and thus may also be referred to as an L-HeMS 140), an HeNB 126, and one or more logical functions that are connected to the ISW-PF 100, which each be referred to as the ISW-PR peripheral 154. It will be appreciated that the example network 99*a* is simplified to facilitate description of the disclosed subject matter and is not intended to limit the scope of this disclosure. Other devices, systems, and configurations may be used to implement the embodiments disclosed herein in addition to, or instead of, a network such as the network 99*a*, and all such embodiments are contemplated as within the scope of the present disclosure.

Still referring to FIG. 14, in accordance with the illustrated embodiment, the ISW-PF Peripheral 154 detects a network event at 200. At 202, the ISW-PF Peripheral 154 notifies the ISW-PF 100. It will be understood that the ISW-PF Peripheral 154 may be implemented by the Traffic Monitor 134, Small Cells 126 (via the Small Cell Management Interface 140), Wi-Fi AP's 118 (via a Wi-Fi AP Management Interface 142), ACS 150 (via the TR-069 Client 138), a PCRF, a ISW-PF API, an Application Server, or the like. A variety of events may be detected. By way of example, without limitation, the traffic monitor 134 may detect that: a user has begun using a particular application; a particular subnet in the local IP network, Wi-Fi AP, or small cell is becoming congested; a particular number of users are connected to a small cell or Wi-Fi AP; or user's point of connection has changed. Examples of Small Cell events or Wi-Fi AP events that can be detected at 200 include, presented by way of example and without limitation, new interference measurements or new congestion measurements. Examples of PCRF events that can be detected at 200 include, presented by way of example and without limitation, new policies are received via the S9a reference point. The new policies may be associated with, for example, particular traffic flows, applications, or users. In an example embodiment, new policies may originate in an AS that has an Rx interface with the PCRF and the PCRF may forward the policies, which may include rules, to the ISW-PF 100 via the S9a interface. The Application server (AS) may detect events such as detecting a new policy related to a flow between the AS and a user in the local network. Examples of ISW-PF API events that can be detected at 200 include, presented by way of example and without limitation, detecting new policies related to which applications are permitted to run in the network, detecting new policies related to what QoS treatment should be provided to particular applications, or detecting new permissions associated with a given user or group of users.

With continuing reference to FIG. 14, in accordance with the illustrated embodiment, at 202, the ISW-PF Peripheral 154 notifies the ISW-PF 100 of the network event that was detected. At 204, the ISW-PF 100 acknowledges the notification. At 206, new network parameters are computed. For example, the ISW-PF 100 may compute new network parameters based on information associated with the new network event, existing network conditions, and/or other network preferences. The new network parameters may include a new configuration for an HeNB, for instance the illustrated HeNB 126. For example, the ISW-PF 100 may determine that a particular HeNB, for instance the HeNB 126, can be switched off, its transmit power can be adjusted, a different frequency should be used for communication, the bandwidth provided to a user should be adjusted, or that new QoS policies need to be provided to the HeNB 126. In accordance with the illustrated example, if the ISW-PF 100 desires to change the configuration of the HeNB 126, the ISW-PF 100 may notify the HeNB 126, via the L-HeMS 140, of the new network parameters (see 208). At 210, the L-HeMS 140 may acknowledge the new network parameters. At 212, if the L-HeMS 140 does not already have a secure connection with the HeNB 126, for example, a secure connection may be established between the L-HeMS 140 and the HeNB 126. At 214, the L-HeMS 140 may use a TR-069 SetParametersValues( ) RCP method to configure the HeNB 126. For example, the HeNB 126 may be configured with a new transmit power, the HeNB may be shut off, or the like. At 216, in accordance with the illustrated example, the HeNB 126 acknowledges the new parameter via a SetParametersResponse( )) RCP mechanism. At 224, the HeNB 126 may release the TR-069 session. At 218, the ISW-PF 100 may notify the ISWN TR-069 Client 138, which can be a virtual ISWN TR-0169 client, of the new HeNB configuration. As shown, the ISWN TR-069 client 138 may use a TR-069 inform request method to notify the HeMS ACS 150 of the updated HeNB settings. Thus, the EPC can use this information to perform better E2E (e.g., P-GW← →UE) traffic control. For example, if the bandwidth available to a small cell has decreased, the P-GW may avoid forwarding too much traffic to the ISWN 99*a*. At 222, the ACS 150 may acknowledge the inform request.

It is understood that the entities performing the steps illustrated in FIG. 14 are logical entities that may be implemented in the form of software (e.g., computer-executable instructions) stored in a memory of, and executing on a processor of, a device, server, or computer system such as those illustrated in FIGS. 21A and 21B, which are described in further detail below. In particular, for example, the ISW-PF 100, which may be referred to generally as a network entity, may comprise a processor and a memory, the memory containing computer-executable instructions that when executed by the processor, cause the processor to perform operations comprising computing new network parameters as described above.

In a accordance with an example embodiment, a CAPWAP binding is created for controlling Femto Access points, such as a Home NB or a Home eNB for example. A CAPWAP binding for H(e)NB management may define how H(e)NB functions are divided between the controlled (the ISW-PF 100) and the H(e)NB depending on whether CAPWAP is used in split MAC or local MAC mode. Referring generally to FIG. 14, CAPWAP may be used to send management configuration parameters to the H(e)NB 126. The CAPWAP Configuration Update Request message can be used to set parameters in the H(e)NB 126. The message elements can be defined based on the writable data fields, such as data fields that are listed in TR-196, TR-262, TR-157, and TR-181. In some cases, the CAPWAP Configuration Update Request message may replace the SetParameterValues and SetAttributeValues messages that are used in TR-069 to set the configuration of the H(e)NB 126.

A CAPWAP Configuration Status Request message can be used to read parameters in the H(e)NB. The message elements can be defined based on the readable data fields that are listed in TR-196, TR-262, TR-157, and TR-181. In some cases, this message may replace the GetParameterValues and GetAttributeValues messages that are used in TR-069 to read the configuration of a H(e)NB. The CAPWAP Configuration Status Response message can be used by the H(e)NB to send parameter values to the ISW-PF. The message elements can be defined based on the readable data fields that are listed in TR-196, TR-262, TR-157, and TR-181. In some cases, this message may replace the GetParameterValuesResponse and GetAttributeValuesResponse messages that are used in TR-069 to read the configuration of a H(e)NB.

In an example local MAC mode, the ISW-PF 100 can configure the H(e)NB 126 with the CAPWAP configuration messages that are described above. Additionally, in accordance with an example embodiment, local MAC mode allows data frames to optionally be locally bridged or tunneled to the ISW-PF 100 as 802.3 frames. When data frames are tunneled to the ISW-PF 100, the H(e)NB 126 may exchange PDCP frames with the ISW-PF 100. The PDCP frames may be sent to an IP segmentation/desegmentation function in the ISW-PF 100 that can convert the flow to/from IP.

In an example split MAC mode, the ISW-PF 100 can configure the H(e)NB 126 with the CAPWAP configuration messages that are described above. Additionally, in the example Split MAC mode, data frames are tunneled to the ISW-PF as 802.3 frames. The ISW-PF 100 may perform certain functions for the H(e)NB 126 when the CAPWAP is being used in Split mode. Only the L1 and L2 (PDCP/RLC/MAC) functions of the H(e)NB are implemented in the H(e)NB in accordance with one example embodiment. The RRC and NAS functions may implemented in the ISW-PF 100.

CAPWAP uses DTLS. Thus, if CAPWAP is used by the ISW-PF 100 to manage H(e)NBs, then it is recognized herein that a certain amount of provisioning may be required in the H(e)NB and the ISW-PF. For example, if pre-shared keys are used to secure the DTLS session, then various information may need to be provisioned in the ISW-PF or the H(e)NB. Example information that may be provisioned includes an identity of the CAPWAP peer, a Security Key, and the PSK Identity. If certificates are used to configure the DTLS session, then the device certificates may need to be provisioned in the ISW-PF and the trust anchor may need to be provisioned in the H(e)NB.

The Interface between the ISW-PF and Wi-Fi Access Points, which is referred to herein as a Wi-Fi AP management interface 142, may be based on the 802.11 CAPWAP binding that is described in RFC 5416, Control and Provisioning of Wireless Access Points (CAPWAP) Protocol for IEEE 802.11. The ISW-PF 100 may use CAPWAP to adjust the Tx Power and QoS of the Wi-Fi Access points 118. For example, the ISW-PF 100 may base these settings on input from the site owner, the Tx Power of other Wi-Fi access points within the local network, and the receive signal strength that is observed by the connected Wi-Fi devices.

In an example embodiment, the ISW-PF 100 provide functionality beyond what a wireless LAN controller (WLC) can provide at least because management of the small cells and Wi-Fi access points is integrated with each other. The ISW-PF 100 may control the Wi-Fi access points 118 based on input from the ISWN TR-069 Client/ACS, PCRF, and the Small Cells. For example, the ISW-PF 100 may choose to decrease the Tx Power of a Wi-Fi access point because a nearby small cell is covering the same area, or the ISW-PF 100 may choose to increase the Tx Power of a Wi-Fi access point because a nearby small cell is congested or experiencing high traffic volume. An example embodiment is depicted in FIG. 15, described in more detail below.

The ISW-PF 100 may also adjust the QoS settings of the Wi-Fi access points based on input from a site owner. Further, the tight integration of Wi-Fi and Small Cell control may allow the ISW-PF 100 to consider QoS and policy information from the PCRF and the ISWN TR-069 Client when configuring the QoS settings of the Wi-Fi access points. In an alternative embodiment, TR-069 can be used to manage the Wi-Fi AP's 118 instead of CAPWAP. In such an embodiment, the Wi-Fi AP Management Interface 142 may be a TR-069 Server and the Wi-Fi AP's may be TR-069 clients. A new data model may be required to manage the Wi-Fi AP's. The data model may be based on the 802.11 CAPWAP mapping that is defined in RFC 5416, Control and Provisioning of Wireless Access Points (CAPWAP) Protocol for IEEE 802.11, which is incorporated by reference as if the disclosure of which is presented in its entirety herein.

Referring to FIG. 15, an example ISWN 99b includes an ISW-PF peripheral 154a, the ISW-PF 100, the Wi-Fi management interface 142, and one or more Wi-Fi access points 118. It will be appreciated that the example network 99b is simplified to facilitate description of the disclosed subject matter and is not intended to limit the scope of this disclosure. Other devices, systems, and configurations may be used to implement the embodiments disclosed herein in addition to, or instead of, a network such as the network 99b, and all such embodiments are contemplated as within the scope of the present disclosure.

Still referring to FIG. 15, in accordance with the illustrated embodiment, the ISW-PF Peripheral 154a detects a network event at 300. At 302, the ISW-PF Peripheral 154a notifies the ISW-PF 100 of the event. It will be understood that the ISW-PF Peripheral 154 may be implemented by the Traffic Monitor 134, Small Cells 126 (via the Small Cell Management Interface 140), Wi-Fi AP's 118 (via a Wi-Fi AP Management Interface 142), ACS 150 (via the TR-069 Client 138), a PCRF, a ISW-PF API, an Application Server, or the like. A variety of events may be detected. By way of example, without limitation, the traffic monitor 134 may detect that: a user has begun using a particular application; a particular subnet in the local IP network, Wi-Fi AP, or small cell is becoming congested; a particular number of users is connected to a small cell or Wi-Fi AP; or user's point of connection has changed. Examples of Small Cell events or Wi-Fi AP events that can be detected at 300 include, presented by way of example and without limitation, new interference measurements or new congestion measurements. Examples of PCRF events that can be detected at 300 include, presented by way of example and without limitation, new policies are received via the S9a reference point. The new policies may be associated with, for example, particular traffic flows, applications, or users. In an example embodiment, new policies may originate in an AS that has an Rx interface with the PCRF and the PCRF may forward the policies, which may include rules, to the ISW-PF 100 via the S9a interface. The Application server (AS) may detect events such as detecting a new policy related to a flow between the AS and a user in the local network. Examples of ISW-PF API events that can be detected at 300 include, presented by way of example and without limitation, detecting new policies related to which applications are permitted to run in the network, detecting new policies related to what QoS treatment should be provided to particular applications, or detecting new permissions associated with a given user or group of users.

With continuing reference to FIG. 15, in accordance with the illustrated embodiment, at 302, the ISW-PF Peripheral 154*a* notifies the ISW-PF 100 of the network event that was detected. At 304, the ISW-PF 100 acknowledges the notification. At 306, new network parameters are computed. For example, the ISW-PF 100 may compute new network parameters based on information associated with the new network event, existing network conditions, and/or other network preferences. The new network parameters may include a new configuration for at least one of the Wi-Fi access points 118. For example, the ISW-PR 100 may determine that the QoS of a particular flow should be modified, the transmit power of the AP 118 should be modified, a frequency band of the AP 118 should change, a beacon period of the AP 118 should be adjusted, etc. Based on information about the new network event, the existing network conditions, and other network preferences, the ISW-PF 100 may compute new network parameters. The new network parameters may include a new configuration for a Wi-Fi AP.

Still referring to FIG. 15, if the ISW-PF 100 desires to change the configuration of Wi-Fi AP 118, for example, the ISW-PF 100 may notify the Wi-Fi management interface 142 of the new network parameters (at 308). At 310, the Wi-Fi management interface 142 may acknowledge the new network parameters. At 312, in accordance with the illustrated embodiment, the Wi-Fi management interface 142 uses a CAPWAP Configuration Update Request to configure the Wi-Fi AP 118 with one or more parameters such as, for example, a new transmit power, a new QoS, or the like. Alternately, the CAPWAP command may be a Station Configuration Request or a change state event request. At 314, the Wi-Fi AP 118 acknowledges the new parameter(s) via the CAPWAP Configuration Update Response.

Figure 21A:
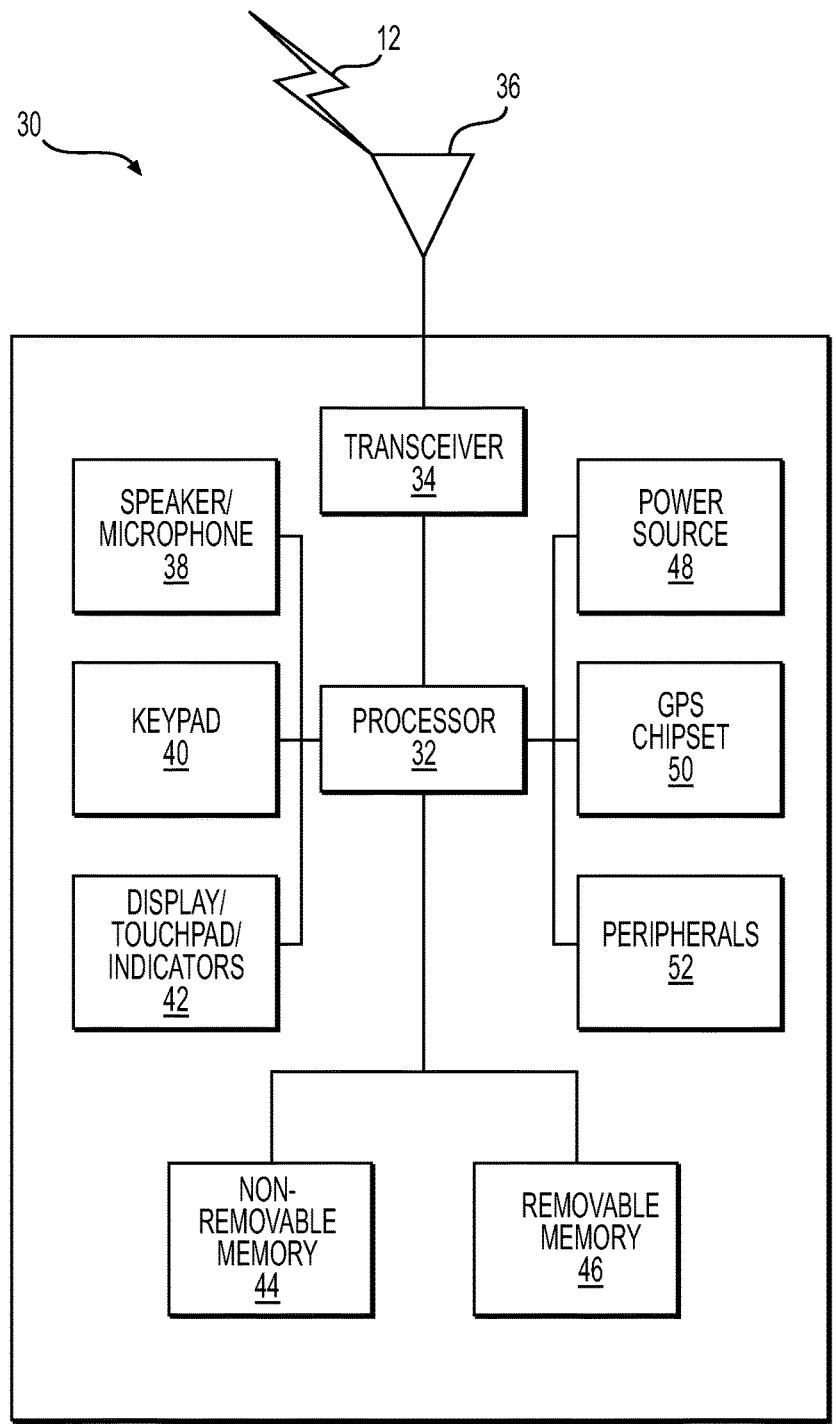
FIG. 21A is a system diagram of an example device that may be used within the system diagram illustrated in FIG. 8.
Figure 21B:
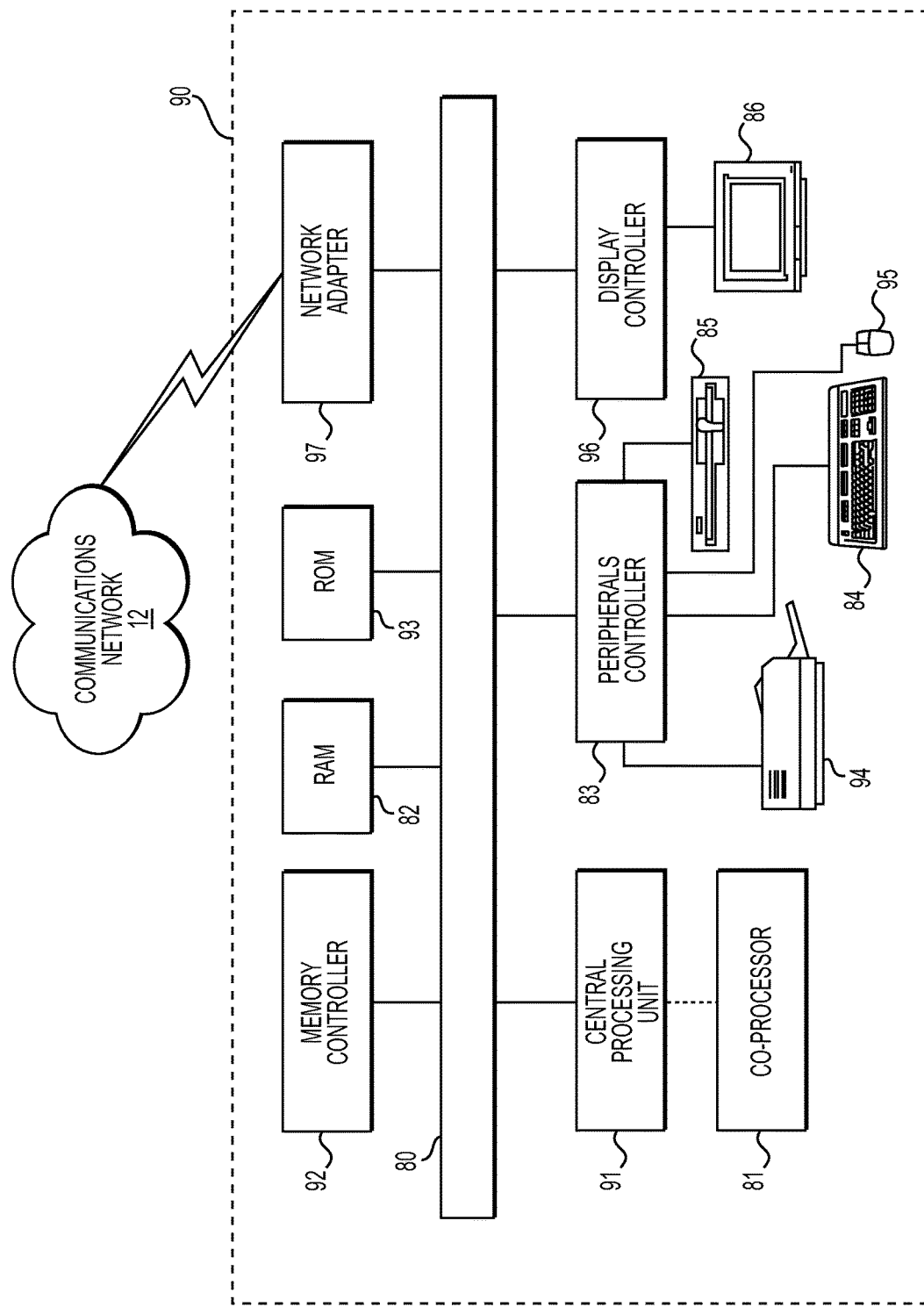
FIG. 21B is a block diagram of an example computing system in which aspects of the above-depicted architectures may be embodied.

It is understood that the entities performing the steps illustrated in FIG. 15 are logical entities that may be implemented in the form of software (e.g., computer-executable instructions) stored in a memory of, and executing on a processor of, a device, server, or computer system such as those illustrated in FIGS. 21A and 21B. In particular, for example, the ISW-PF 100 may comprise a processor and a memory, the memory containing computer-executable instructions that when executed by the processor, cause the processor to perform operations comprising computing new network parameters.

FIGS. 14 and 15 depict an example of how the ISW-PR can manage an HeNB and a Wi-Fi AP in response to detecting various events. It will understood that although FIGS. 14 and 15 are illustrated as separate call flows, the illustrated steps may be combined with each other in any combination as desired. For example, a single event may cause management, control, or updates to both HeNB's and Wi-Fi AP's.

Thus, referring generally to FIGS. 14 and 15, in accordance with an example embodiment, a system or network can include a network entity, for instance the ISW-PF 100, that communicates with a first access point to a first network and a second access point to a second network. An event can be detected at the network entity. The event may be associated with one of the first and second networks. Based on the detected event, the network entity may determine one or more parameters for the other of the first and second networks. The network entity may send the one or more parameters to the access point of the other of the first and second networks such that the access point of the other of the first and second networks is configured with the one or more parameters. By way of example, as described above, detecting the event may include receiving an indication that traffic associated with the one of the first and second networks has changed, receiving an indication that a measure of congestion or interference associated with at the one of the first and second access points has exceeded a threshold, or receiving a new policy related to the one of the first and second networks. In an example embodiment, the first network is a Wi-Fi network, and the first access point is a Wi-Fi access point. The second network may be a small cell network, and the second access point may be a small cell access point. The one or more parameters may re-route data traffic of at least one user equipment (UE) in the first and second network.

Referring now to FIG. 16, an example ISWN 99*c* includes an ISW-PF peripheral 154*b*, a UE 112*b*, the ISW-PF 100, the PCRF 132, a packet data network gateway 152, and an access network discovery and select function (ANDSF) 156. It will be understood that the PCRF 132 can be referred to as a 3GPP core network node. It will be appreciated that the example network 99*c* is simplified to facilitate description of the disclosed subject matter and is not intended to limit the scope of this disclosure. Other devices, systems, and configurations may be used to implement the embodiments disclosed herein in addition to, or instead of, a network such as the network 99*c*, and all such embodiments are contemplated as within the scope of the present disclosure.

An interface between the ISW-PF 100 and the PCRF 132 may be based on the S9a interface that is defined by 3GPP in TS 23.203, Policy and charging control architecture and in TS 29.215, Policy and Charging Control (PCC) over S9 reference point; Stage 3. The S9a interface was defined to allow MNO operators to exchange policy information so that QoS can be provided when a UE is anchored to a P-GW in a visited network, such as another EPC and/or a Broadband Network for example.

In accordance with the illustrated embodiment, the ISW-PF 100 may use policy information from the PCRF 132 (or BPCF) to make decisions about how to configure QoS for traffic inside of the ISW network 99*c*. For example, the UE 112*b* may connect to the mobile network through a small cell and expect a certain level of QoS on the connection. Once the uplink traffic reaches the core network, the MNO may be able to guarantee QoS on the GTP tunnel. However, for example, the MNO might have no control of the QoS that is provided to the GTP tunnel between the UE and core network entry point. The ISW-PF 100 may use policies that are obtained over the S9a interface to configure the small cells and Wi-Fi access points so that DSCP markings can be applied on the GTP tunnels between the HeNB and EPC.

Still referring to FIG. 16, an example call flow depicts an example of how the ISW-PF 100 may inform the EPC of a condition in the local network. Further, the EPC makes adjustments in response to the conditions in the local network. For example, the ISW-PF 100 may inform the PCRF 132 that a video that is streaming to the UE 112*b* over a Wi-Fi connection is causing congestion in the local Wi-Fi network. The PCRF 132 may react to this information by updating the ISRP's so that the flow is streamed over the cellular connection.

In accordance with the illustrated embodiment, at 400, the ISW-PF Peripheral 154*b* detects a network event and notifies the ISW-PF 100 of the detected event. It will be understood that the ISW-PF Peripheral 154 may be implemented by the Traffic Monitor 134, Small Cells 126 (via the Small Cell Management Interface 140), Wi-Fi AP's 118 (via a Wi-Fi AP Management Interface 142), ACS 150 (via the TR-069 Client 138), the PCRF 132, a ISW-PF API, an Application Server, or the like. A variety of events may be detected. By way of example, without limitation, the traffic monitor 134 may detect that: a user has begun using a particular application; a particular subnet in the local IP network, Wi-Fi AP, or small cell is becoming congested; a particular number of users who are connected to a small cell or Wi-Fi AP; or user's point of connection has changed. Examples of Small Cell events or Wi-Fi AP events that can be detected at 400 include, presented by way of example and without limitation, new interference measurements or new congestion measurements. Examples of PCRF events that can be detected at 400 include, presented by way of example and without limitation, new policies are received via the S9a reference point. The new policies may be associated with, for example, particular traffic flows, applications, or users. In an example embodiment, new policies may originate in an AS that has an Rx interface with the PCRF 132 and the PCRF 132 may forward the policies, which may include rules, to the ISW-PF 100 via the S9a interface. The Application server (AS) may detect events such as detecting a new policy related to a flow between the AS and a user in the local network. Examples of ISW-PF API events that can be detected at 200 include, presented by way of example and without limitation, detecting new policies related to which applications are permitted to run in the network, detecting new policies related to what QoS treatment should be provided to particular applications, or detecting new permissions associated with a given user or group of users.

Still referring to FIG. 16, in accordance with the illustrated example, at 402, the ISW-PF Peripheral 154*b* notifies the ISW-PF 100 of the network event. At 404, the ISW-PF 100 acknowledges the notification. At 406, based on information about the new network event, the existing network conditions, other network preferences, or the like, the ISW-PF 100 computes new network parameters or preferences. The new network parameters may include a new preference related to how traffic to/from the UE 112*b* is routed over Wi-Fi and cellular RATs. For example, it may be decided that at least a portion for instance all, of a particular flow should be routed over the cellular RAN instead of the Wi-Fi RAN. This message may be sent to the PCRF 132 via the S9a reference point in a Diameter CCR message. Thus, at 408, the ISW-PF 100 may indicate to the PCRF 132 that the ISRP's for the UE 112*b* (or group of UE's) should be modified. Further, the ISW-PF 100 may provide the PCRF 132 with guidance concerning how the ISRP's should be modified. For example, the ISW-PF 100 may indicate that a percentage of the data flow should be routed over the cellular RAN and a percentage of the data flow over the Wi-Fi RAN. It will be understood that the ISW-PF 100 may provide alternative guidance as desired. Thus, at 408, the CC-Request-Type AVP in the CCR command may be set to "UPDATE_REQUEST", and the Rule-Failure-Code AVP in the CCR command may be set to RESOURCES_LIMITATION. Alternatively, the Rule-Failure-Code AVP may be updated, or a new AVP may be added so that the ISW-PF 100 can indicate to the PCRF 132 more details about the resource limitation. An example limitation indicates that the local Wi-Fi network is congested so traffic should be moved to a cellular connection. Another example limitation indicates that the local small cell network is congested so traffic should be moved to a Wi-Fi connection. Yet another example limitation indicates that the local network is congested so traffic should be moved to a macro cellular connection.

In accordance with the illustrated example, at 410, the PCRF 132 responds to the request from the ISW-PF 100. The response may include a Diameter CCA message. At 412, the PCRF sends new ISRP's to the P-GW 152. This message may be sent to the P-GW 152 via the Gx reference point, and a Diameter CCR command may be used to send these rules. At 414, the P-GW 152 may respond to the CCR command. The response may include a Diameter CCA message. At 416, the P-GW 152 may apply the new ISRP's by modifying the TFT's that are impacted by the ISRP. It will be understood that TFT's are IP Packet filters that used by the P-GW 152 to process downlink data towards a UE, for instance the UE 112*b*. The filters may determine what RAN will be used to send the packet to the UE 112*b* (e.g., Wi-Fi or Cellular). At 418, the PCRF 132 may send new ISRP's directly to the ANDSF server 156 or it may send the new ISRP's to the ANDSF server 156 via the UDR. At 420, the ANDSF server 156 may install the new policies in the UE 112*b* so that the UE may modify its TFT's. The message at 420 may be sent over the S14 reference point. The TFT's may be IP Packet filters that used by the UE 112*b* to process uplink data. The filters may determine what RAN is used to send the packet to the P-GW 152 or to the backhaul (e.g., Wi-Fi or Cellular).

Thus, a system or network may include a network entity, for instance the ISW-PF 100, that communicates with a first access point to a first network and a second access point to a second network. At the network entity, an event may be detected, and the event may be associated with one of the first and second networks. Based on the detected event, the network entity may determine one or more parameters for the other of the first and second networks. The network entity may send the one or more parameters to a core network node, for instance the PCRF 132, of the other of the first and second networks such that the core network node of the other of the first and second networks is configured with the one or more parameters. Detecting the event may include receiving an indication that traffic associated with the one of the first and second networks has changed, receiving an indication that a measure of congestion or interference associated with at the one of the first and second access points has exceeded a threshold, or receiving a new policy related to the one of the first and second networks. As described above, the core network node may be a 3GPP PCRF.

The call flow described above with reference to FIG. 16 shows the ISW-PF 100 notifying the PCRF 132 of a local network condition. Alternatively, the notification can be sent to an ANDSF server in the EPC or in the local network. If the notification is sent to the ANDSF server in the EPC, for example, it may be sent via the UDR in the EPC. It is understood that the entities performing the steps illustrated in FIG. 16 are logical entities that may be implemented in the form of software (e.g., computer-executable instructions) stored in a memory of, and executing on a processor of, a device, server, or computer system such as those illustrated in FIGS. 21A and 21B. In particular, for example, the ISW-PF 100 may comprise a processor and a memory, the memory containing computer-executable instructions that when executed by the processor, cause the processor to perform operations comprising computing new network parameters as described above.

Referring generally to FIG. 11, in accordance with an example embodiment, the traffic monitor 134 behaves much like a deep packet inspection (DPI) engine. The traffic monitor 134 may monitor traffic within the ISW network (from small cells and Wi-Fi access points) and may provide statistics to the ISW-PF 100. The ISW-PF 100 uses various information such as, for example, information from the traffic manager 132, measurements from the small cells and Wi-Fi Access points, and policies from the SACS, PCRF, and network owner for example, to adjust the small cell and Wi-Fi AP parameters for efficient network operation.

In accordance with an example embodiment, the ISW-PF API allows the site owner (e.g., IT department) to configure and monitor the small cells and Wi-Fi access points, view the configuration that was provided by the ACS, view the policies that were provided by the PCRF 132, set permissions for what applications are allowed to run in the network, configure CSG's, and configure the ISW-PF 100 so that it knows how to prioritize conflicting policies between the site owner, PCRF, ACS, and API. The API may be SNMP based and used by a front end GUI to provide the Enterprise IT with a more convenient interface.

Figure 17:
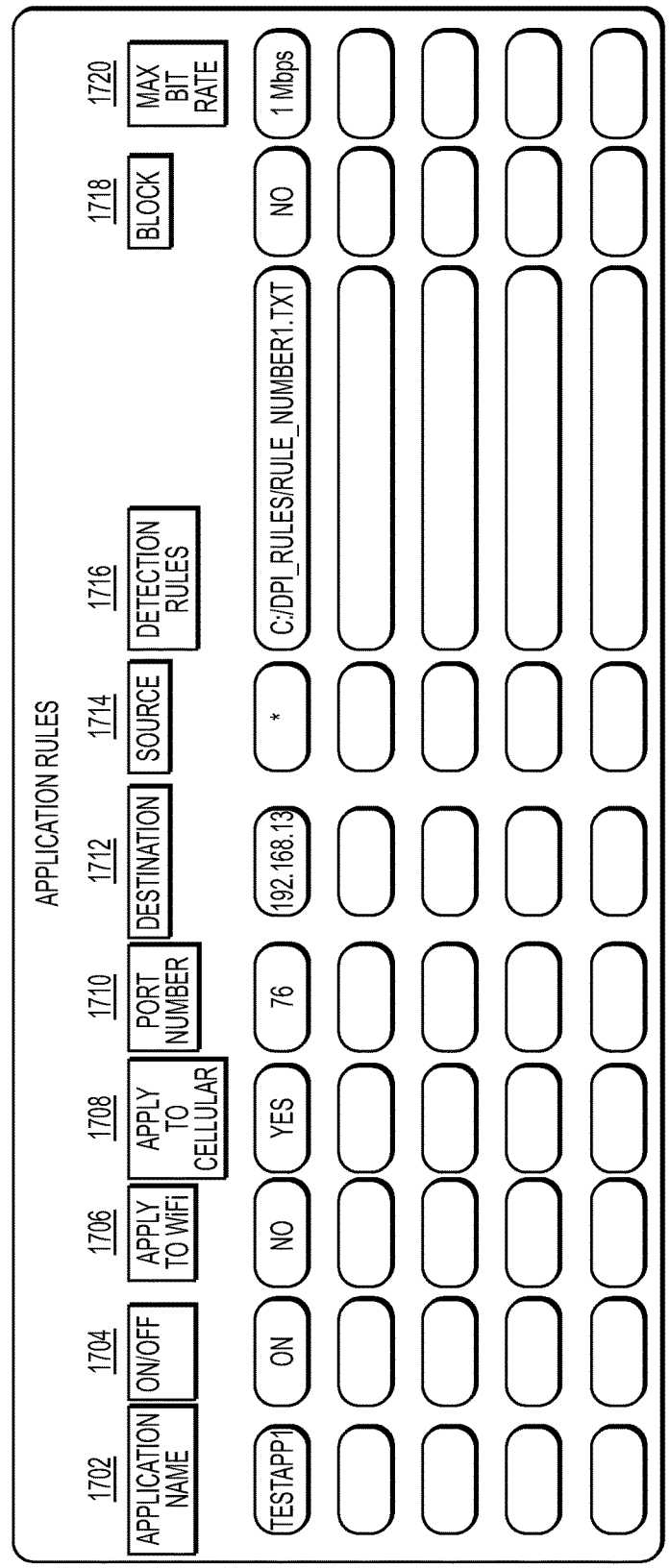
FIG. 17 is an example graphical user interface (GUI) for configuration of local network application rules in accordance with an example embodiment.

FIG. 17 shows an example GUI 1700 that may be used to configure the ISW-PF 100 with application rules. A first column 1702 in the GUI 1700 allows a user to give the rule an identifying name. A second column 1704 in the GUI 1700 allows the user to selectively enable or disable the rule. A third column 1706 and a fourth column 1708 in the GUI 1700 allow the user to select if the rule applies to Wi-Fi traffic or small cell traffic, respectively, or both Wi-Fi and small cell traffic. A port number column 1710 allows the user to specify that the rule applies to certain port number(s). For example, the user may enter a wildcard character (*) in the column 1710 to indicate that the rule applies to all port numbers. A destination column 1712 and a source column 1714 allow the user to indicate if the rule applies only to certain destination and/or source addresses respectively. The wildcard character (*) may be used to indicate that the rule applies to all source and/or destination addresses. A detection rules column 1716 allows the user to provide the ISW-PF 100 with a file that describes DPI rules that should be used to detect the traffic. A Block column 1718 can be used to indicate that traffic that matches this rule should be blocked. The maximum bit rate column 1720 may be used to indicate the maximum bit rate that should be allowed for traffic that matches this rule. For example, if the traffic that is associated with this rule exceeds the maximum bit rate, the ISW-PF 100 may choose to drop packets that are associated with this application. The illustrated fields are presented for purposes of example, though it will be understood that other fields may be rendered for configuring application rules as desired. For example, the GUI 1700 may allow for the configuration of rules on a per-user basis, on a per group basis, on a per-AP basis, a per-small cell basis, etc. Further, although the various user selection options are illustrated in columns in the example GUI 1700, it will be understood that use selection options can be alternatively rendered as desired.

Figure 18:
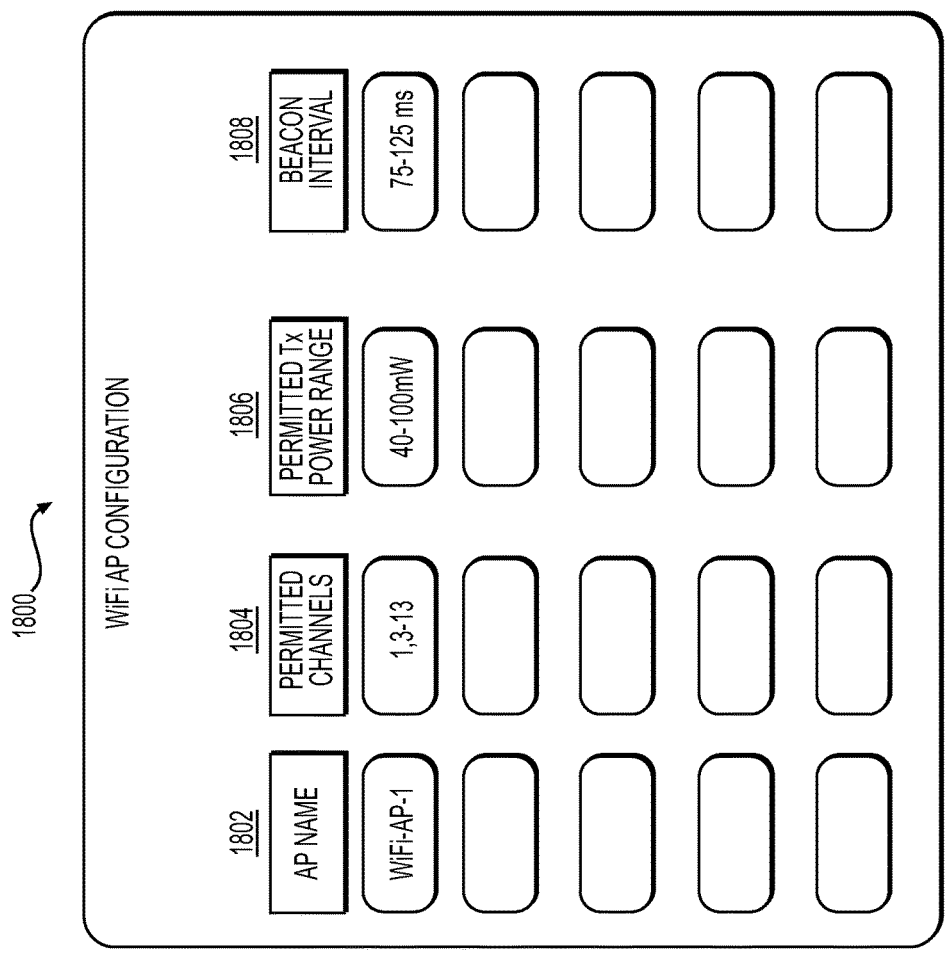
FIG. 18 is an example GUI for configuration of a Wi-Fi access point (AP) in accordance with an example embodiment.

FIG. 18 shows an example GUI 1800 that may be used to configure the Wi-Fi access points 118 that are controlled by the ISW-PF 100. A first column 1802 allows a user to provide an identifying name for each of the AP's. A second column 1804 allows the user to provide a list of channels that may be used by the AP. A third column 1806 allows the user to provide an acceptable Tx Power range for the AP. A fourth column 1808 can be used to provide an acceptable range for the AP's beacon interval. The illustrated columns are presented by way of example, and it will be understood that other fields may be rendered for configuring Wi-Fi access pointes as desired. For example, the GUI 1800 can include fields that allow the user to input a list of subscribers that are permitted to use the AP, a list of users that are restricted from using the AP, etc. Further, the GUI 1800 may allow the user to configure the parameters that are described by the message elements that are defined in reference RFC 5416, referenced above. Further, although the various user selection options are illustrated in columns in the example GUI 1800, it will be understood that use selection options can be alternatively rendered as desired.

Because the ISW-PF 100 may have interfaces to the EPC (e.g., S9a), the ISW-PF 100 may be aware of the QoS requirements of at least some, for instance all, of the active data flows in the local network. The ISW-PF 100 may choose to adjust the beacon interval based on the settings that were input to the GUI as described above. The ISW-PF 100 may further adjust the beacon interval based on requirements of the active data flows, the time of day, etc. For example, the ISW-PF 100 may choose to increase the beacon interval during times of day when it has detected that many devices typically join the network. By way of another example, the ISW-PF 100 may determine to increase the beacon interval based on the application characteristics that were entered in the GUI or obtained via the TR-069 interface or the S9a interface.

Figure 19:
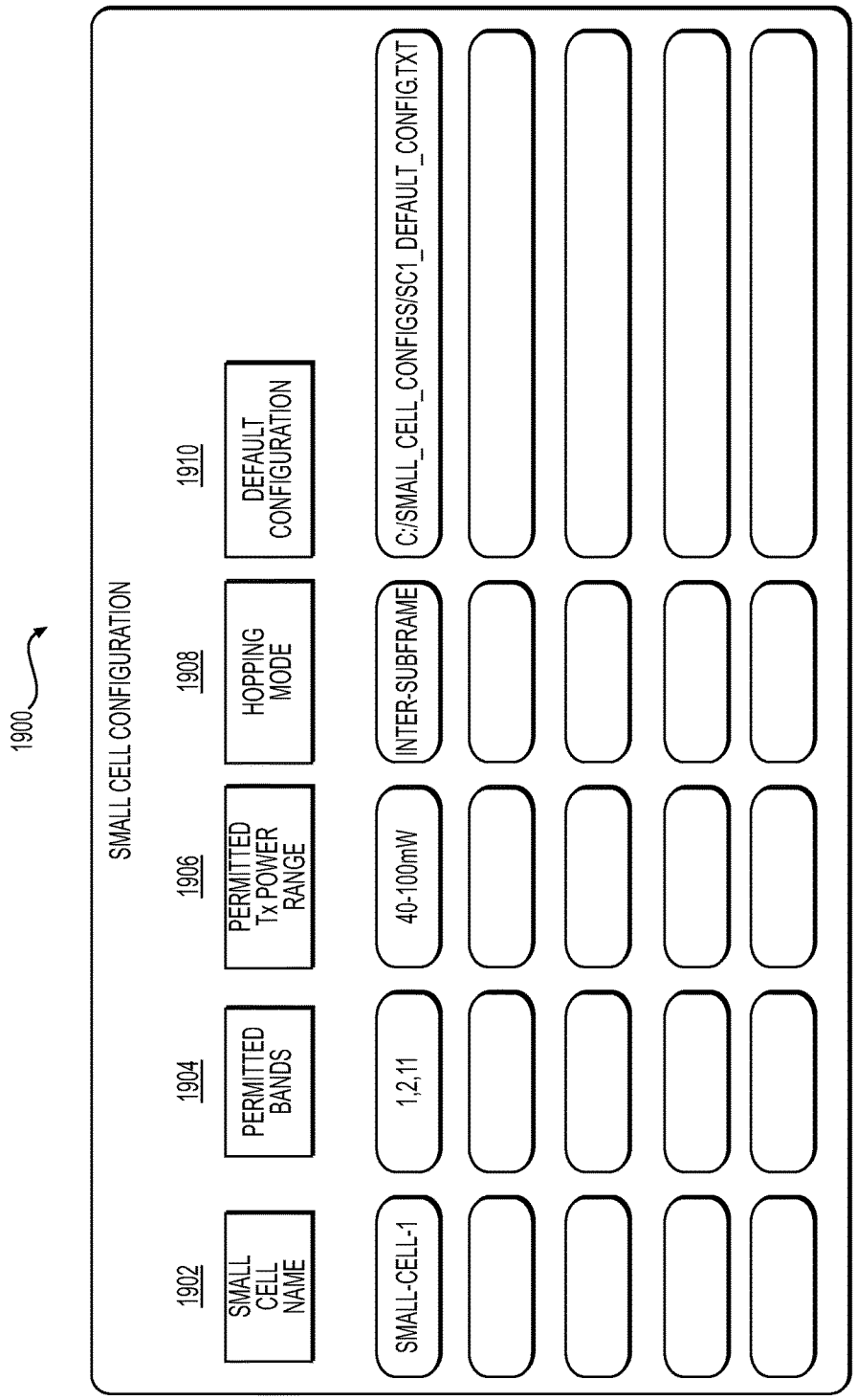
FIG. 19 is an example GUI for configuration of a small cell in accordance with an example embodiment.

FIG. 19 shows another example GUI 1900 that may be used to provide the ISW-PF 100 with small cell configuration information. A first column 1902 allows the user to provide an identifying name for a small cell. A second column 1904 allows the user to provide the ISW-PF 100 with a list of frequency bands that the small cell is permitted to use. A third column 1906 allows the user to enter a permitted Tx power range for the small cell. This column may be enhanced to allow the user to enter a different Tx Power range for each channel. A fourth column 1908 may be used to set the frequency hopping mode of the small cell to "inter-subframe" or "intra-and-inter-subframe". A fifth column 1910 may be used by the user to load a configuration file to the ISW-PF with configuration information for the small cell. The illustrated columns are presented by way of example, and it will be understood that other fields may be rendered for configuring small cells as desired. For example, the GUI 1900 can include fields that allow the user to input a list of subscribers that are permitted to use the small cell, a list of users that are restricted from using the small cell, etc. Further, the GUI 1900 may allow the user to configure the parameters that are described by the message elements that are defined in in the data models that describe the FAPISWN, such as TR-196, TR-262, TR-157, and TR-181. Further, although the various user selection options are illustrated in columns in the example GUI 1900, it will be understood that use selection options can be alternatively rendered as desired.

At least because the ISW-PF 100 can be configured with knowledge about the application data flows that are active in the small cell and Wi-Fi networks, the ISW-PF 100 can adjust the operating settings of the small cell(s) based on the GUI configuration and the needs of the applications. For example, if the Wi-Fi network is congested, the ISW-PF 100 may adjust its Tx Power in order to enable more users to take advantage of the cellular spectrum.

Figure 20:
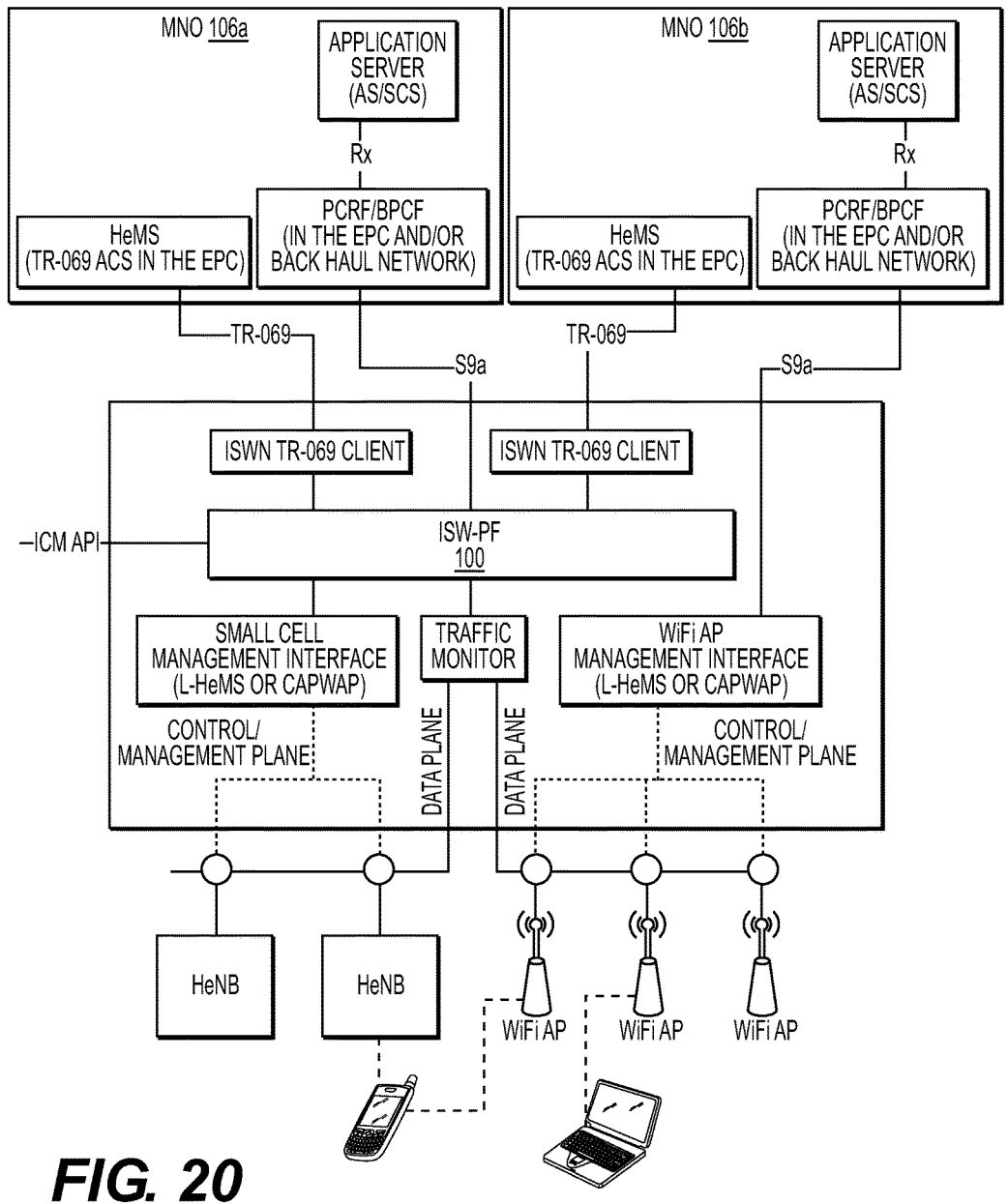
FIG. 20 depicts an ISWN sharing architecture in accordance with an example embodiment.

Referring now to FIG. 20, the ISW-PF 100 may facilitate the sharing of an ISW between multiple network operators 106, for instance a first MNO 106*a* and a second MNO 1066*b*. By way of example, suppose an airport deploys a large ISW network and multiple MNO's pay a fee to the airport for using the ISW. Each MNO may pay the airport different amounts for various levels of service (throughput). For example, the aggregate traffic from subscribers of the first MNO 106*a* may not exceed 10 GB/s, and the aggregate traffic from the second MNO 106*b* may not exceed 5 GB/s. The ISW-PF 100 may create a virtual ISWN for each MNO 106*a* and 106*b* such that it appears to each MNO that they have complete control over an ISW. Further, an MNO may have no visibility or insight into the traffic that is generated by the other MNOs.

FIG. 20 shows an example network sharing architecture for an example ISW. In this example, the network is shared between the first MNO 106*a* and the second MNO 106*b*. The ISW-PF 100 may create a virtual FAP ISWN for interfacing to the ACS of each MNO and the ISW-PF 100 may consider the settings, requirements, and service agreement of both MNO's when determining how to configure and allocate the resources of the ISW. Alternatively, the ISW may configure the Virtual ISWNs to present themselves to the ACS as real HeNB's. In other words, the Virtual ISWN may use the TR-196 data model and the ACS may treat the network as a single HeNB. Thus, the ISW-PF 100 can hide the details of the underlying network from the MNO.

FIGS. 8-20 and the description related thereto illustrate various embodiments of methods and apparatus for controlling policy in an ISWN. In these figures, various steps or operations are shown being performed by one or more nodes, devices, functions, or networks. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures described herein (e.g., see FIG. 8). That is, the methods illustrated in FIGS. 14-16 may be implemented in the form of software (e.g., computer-executable instructions) stored in a memory of a network node, such as for example the node or computer system illustrated in FIG. 21A or 21B, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 21A and 21B, respectively) of the node under control of the processor of the node and the computer-executable instructions (e.g., software) that it executes.

FIG. 21A is a system diagram of an example wireless communications device 30, such as, for example, a UE 112 or a server that may be used to implement the ISW-PF 100. As shown in FIG. 21A, the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicators that operate as part of a user interface. For example, the display/touchpad/indicator(s) may render the example GUIs 1700, 1800, and 1900. It will be appreciated that the device 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 21A depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 21A, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 14-16) and in the claims. While FIG. 21A depicts the processor 32 and the transceiver 34 as separate components, it will be appreciated that the processor 32 and the transceiver 34 may be integrated together in an electronic package or chip.

The transmit/receive element 36 may be configured to transmit signals to, and/or receive signals from, an eNode-B, Home eNode-B, WiFi access point, etc. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21A as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 21B depicts a block diagram of an exemplary computing system 90 that may be used to implement the systems and methods described herein. For example, the computing system 1000 may be used to implement devices that operate as, for example, the ISW-PF 100 as described above. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed inter-system mobility systems and methods as disclosed above including, for example, that discussed in connection with the ISW-PF 100.

Following is a list of acronyms relating to service level technologies that may appear in the above description.

| | |
|---|---|
| ACS | Auto Configuration Server |
| AS | Application Server |
| API | Application Programming Interface |
| BPCF | Broadband Policy Control Framework |
| CAPWAP | Control and Provisioning of Wireless Access Points |
| CM | Configuration Management |
| CPE | Customer Premise Equipment |
| CSG | Close Subscriber Group |
| DPI | Deep Packet Inspection |
| DTLS | Datagram Transport Layer Security |
| EPC | Evolved Packet Core |
| ESCC | Enterprise Small Cell Concentrator |
| ESCG | Enterprise Small Cell Gateway |
| FAP | Femto Access Point |
| FM | Fault Management |
| HeMS | HeNB Management System |
| HeNB | Home Enhanced NodeB |
| HMS | HNB Management System |
| HNB | Home NodeB |
| ISW | Integrated Small Cell Wi-Fi |
| ISWN | Integrated Small Cell Wi-Fi Network |
| ISW-PF | Integrated Small Cell Wi-Fi Policy Function |
| L-GW | Local Gateway |
| LIPA | Local IP Access |
| MIB | Management Information Base |
| MNO | Mobile Network Operator |
| NAS | Non-Access Stratum |
| NMS | Network Management System |
| PCRF | Policy and Charging Rules Function |
| PDCP | Packet Data Convergence |
| PM | Performance Management |
| PSK | Pre-Shared Key |
| QoS | Quality of Service |
| RLC | Radio Link Control |
| RRC | Radio Resource Control |
| SCS | Service Capability Server |
| SNMP | Simple Management Protocol |
| TFT | Traffic Flow Template |
| TIA | Telecommunications Industry Association |
| UDR | User Data Repository |
| UE | User Equipment |
| WLC | Wireless LAN Controller |
| XML | Extensible Markup Language |

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, the method being performed by an apparatus, the method comprising:
    configuring the apparatus to communicate with a WiFi network, the WiFi network comprising a management interface and a WiFi access point;
    configuring the apparatus to communicate with a small cell network comprising a small cell access point, wherein the small cell network is associated with a small cell coverage area, the WiFi network is associated with a WiFi coverage area, and the small cell coverage area and the WiFi coverage area overlap at least partially;
    receiving, from the management interface, an event notification pertaining to an event associated with the WiFi network, wherein the event has been triggered by the management interface upon detecting a condition comprising threshold number of users connected to the WiFi access point;
    based on the event notification pertaining to the event, determining, by the apparatus, one or more parameters pertaining to a resource limitation for the small cell access point and the WiFi access point, wherein the resource limitation is a limitation of a measurement period, a transmit power, or an admission control;

sending, by the apparatus, to the integrated WiFi and cellular policy engine, the one or more parameters pertaining to the resource limitation and guidance information pertaining to how a policy should be modified, the policy relating to how much traffic is sent and received via the small cell access point; and receiving an indication that traffic associated with the WiFi access point has changed.

2. The method of claim 1, further comprising receiving a new policy related to the WiFi access point.

3. The apparatus of claim 1, wherein the one or more parameters indicate a reroute of data traffic of at least one user equipment (UE).

4. An apparatus, comprising communication circuitry, a processor, and a memory, the memory containing computer-executable instructions that, when executed by the processor, cause the processor to perform operations comprising:
  configure the apparatus to communicate with a WiFi network, the WiFi network comprising a management interface and a WiFi access point;
  configure the apparatus to communicate with a small cell network comprising a small cell access point, wherein the small cell network is associated with a small cell coverage area, the WiFi network is associated with a WiFi coverage area, and the small cell coverage area and the WiFi coverage area overlap at least partially;
  receive, from the management interface, an event notification pertaining to an event associated with the WiFi network, wherein the event has been triggered by the management interface upon detecting a condition comprising threshold number of users connected to the WiFi access point;
  based on the event notification pertaining to the event, determine, by the apparatus, one or more parameters pertaining to a resource limitation for the small cell access point and the WiFi access point, wherein the resource limitation is a limitation of a measurement period, a transmit power, or an admission control;
  send, to the integrated WiFi and cellular policy engine, the one or more parameters pertaining to the resource limitation and guidance information pertaining to how a policy should be modified, the policy relating to how much traffic is sent and received via the small cell access point; and
  receive an indication that traffic associated with the WiFi access point has changed.

5. The apparatus of claim 4, wherein the operations further comprise receive a new policy related to the WiFi access point.

6. The apparatus of claim 4, wherein the one or more parameters indicate a reroute of data traffic of at least one user equipment (UE).

7. A system comprising:
  one or more processors; and
  memory coupled with the one or more processors, the memory storing executable instructions that when executed by the one or more processors cause the one or more processors to effectuate operations comprising:
    configure an apparatus to communicate with a WiFi network, the WiFi network comprising a management interface and a WiFi access point;
    configure the apparatus to communicate with a small cell network comprising a small cell access point, wherein the small cell network is associated with a small cell coverage area, the WiFi network is associated with a WiFi coverage area, and the small cell coverage area and the WiFi coverage area overlap at least partially;
    receive, from the management interface, an event notification pertaining to an event associated with the WiFi network, wherein the event has been triggered by the management interface upon detecting a condition comprising threshold number of users connected to the WiFi access point;
    based on the event notification pertaining to the event, determine, by the apparatus, one or more parameters pertaining to a resource limitation for the small cell access point and the WiFi access point, wherein the resource limitation is a limitation of a measurement period, a transmit power, or an admission control;
    send, by the apparatus, to the integrated WiFi and cellular policy engine, the one or more parameters pertaining to the resource limitation and guidance information pertaining to how a policy should be modified, the policy relating to how much traffic is sent and received via the small cell access point; and
    receive an indication that traffic associated with the WiFi access point has changed.

8. The system of claim 7, wherein the operations further comprise receive a new policy related to the WiFi access point.

9. The system of claim 7, wherein the one or more parameters indicate a rerouting of data traffic of at least one user equipment (UE).

* * * * *